United States Patent
Chaney et al.

(10) Patent No.: US 12,484,484 B2
(45) Date of Patent: Dec. 2, 2025

(54) DYNAMIC RESISTANCE GENERATOR FOR SQUARE BALER

(71) Applicant: DEERE & COMPANY, Moline, IL (US)

(72) Inventors: Nathan A. Chaney, Bloomfield, IA (US); Christopher L. Bradshaw, Sherrard, IL (US)

(73) Assignee: DEERE & COMPANY, Moline, IL (US)

( * ) Notice: Subject to any disclaimer, the term of this patent is extended or adjusted under 35 U.S.C. 154(b) by 588 days.

(21) Appl. No.: 18/047,483

(22) Filed: Oct. 18, 2022

(65) Prior Publication Data

US 2024/0122122 A1 Apr. 18, 2024

(51) Int. Cl.
*A01F 15/08* (2006.01)
*A01F 15/04* (2006.01)

(52) U.S. Cl.
CPC ........ *A01F 15/0825* (2013.01); *A01F 15/042* (2013.01); *A01F 15/046* (2013.01)

(58) Field of Classification Search
CPC ... A01F 15/0825; A01F 15/042; A01F 15/046
See application file for complete search history.

(56) References Cited

U.S. PATENT DOCUMENTS

| | | | |
|---|---|---|---|
| 2,633,794 A | 4/1953 | Rothrock | |
| 5,253,570 A * | 10/1993 | Goeckner | A01F 15/0825 100/41 |
| 5,540,144 A * | 7/1996 | Schrag | A01F 15/0875 100/188 R |
| 6,026,741 A * | 2/2000 | Lippens | A01F 15/0825 100/41 |
| 2002/0100374 A1* | 8/2002 | Ast | B65B 27/12 100/232 |
| 2013/0019765 A1* | 1/2013 | Demon | A01F 15/0875 100/218 |
| 2015/0078804 A1* | 3/2015 | Ehrlich | B60P 7/0807 403/10 |
| 2018/0192591 A1 | 7/2018 | Monbaliu | |

FOREIGN PATENT DOCUMENTS

DE 1104250 B 4/1961

OTHER PUBLICATIONS

Extended European Search Report and Written Opinion issued in European Patent Application No. 23193563.6, dated Feb. 20, 2024, in 07 pages.

* cited by examiner

*Primary Examiner* — Claude J Brown

(57) ABSTRACT

A baler implement may include a frame, a first panel, a plunger, and a hook mechanism. The frame has a central longitudinal axis. The first panel partially forms a compression chamber for compressing crop therein. The plunger is operable to reciprocate within the compression chamber to provide a compressive force to compress crop material in the compression chamber into a flake against a plurality of other flakes of a currently forming bale and is operable to move the currently forming bale through the compression chamber. The hook mechanism is positioned on the first panel and is operable to engage the currently forming bale inside the compression chamber to resist the compressive force applied by the plunger to increase compression of the crop material within the compression chamber.

17 Claims, 18 Drawing Sheets

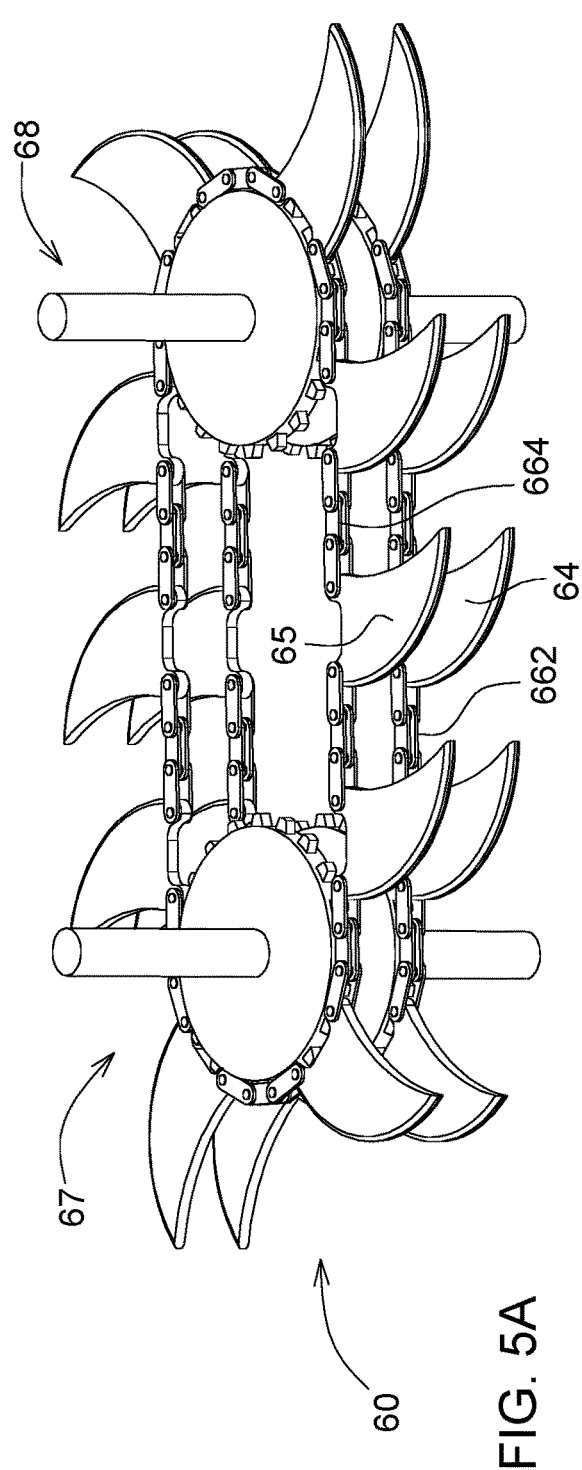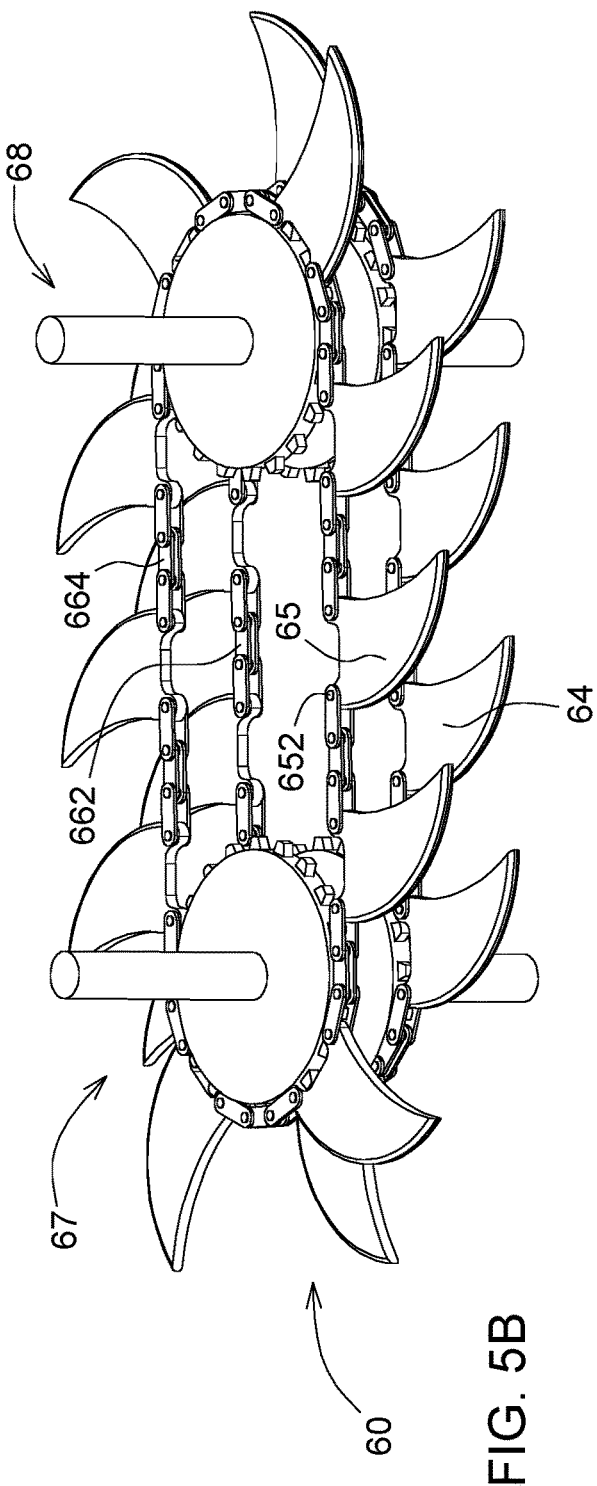
FIG. 5A
FIG. 5B

DYNAMIC RESISTANCE GENERATOR FOR SQUARE BALER

CROSS-REFERENCE TO RELATED APPLICATIONS

N/A.

TECHNICAL FIELD

The present disclosure relates generally to a baler implement that forms bales through a plunger.

BACKGROUND

Baler implements are used to collect crop material and process it into bales. Some baler implements gather the crop material from the field, e.g., windrows, and form the bales through the reciprocation of plungers within the compression chambers thereof. Those baler implements, include square balers, utilize the compression chambers to define the shape of the bales, which are generally rectangular bales. The friction between chambers (e.g., compression chambers) and crop material (i.e., flakes) generates the resistance for packing bales.

SUMMARY

According to an aspect of the present disclosure, a baler implement may include a frame, a first panel, a plunger, and a first hook mechanism (first hook). The frame has a central longitudinal axis. The first panel partially forms a compression chamber for compressing crop therein. The plunger is operable to reciprocate within the compression chamber to provide a compressive force to compress crop material in the compression chamber into a flake against a plurality of other flakes of a currently forming bale and is operable to move the currently forming bale through the compression chamber. The first hook mechanism is positioned on the first panel and is operable to engage the currently forming bale inside the compression chamber to resist the compressive force applied by the plunger to increase compression of the crop material within the compression chamber.

Other features and aspects will become apparent by consideration of the detailed description, claims, and accompanying drawings.

BRIEF DESCRIPTION OF THE DRAWINGS

The detailed description of the drawings refers to the accompanying figures.

FIG. 5A illustrates one arrangement that the teeth of the first carrier and the teeth of the second carrier are stacked.

FIG. 5B illustrates one arrangement that the teeth of the first carrier and the teeth of the second carrier are offset.

Like reference numerals are used to indicate like elements throughout the several figures.

DETAILED DESCRIPTION

The implementation disclosed in the above drawings and the following detailed description are not intended to be exhaustive or to limit the disclosure to these embodiments. Rather, there are several variations and modifications which may be made without departing from the scope of the present disclosure.

Figure 1:
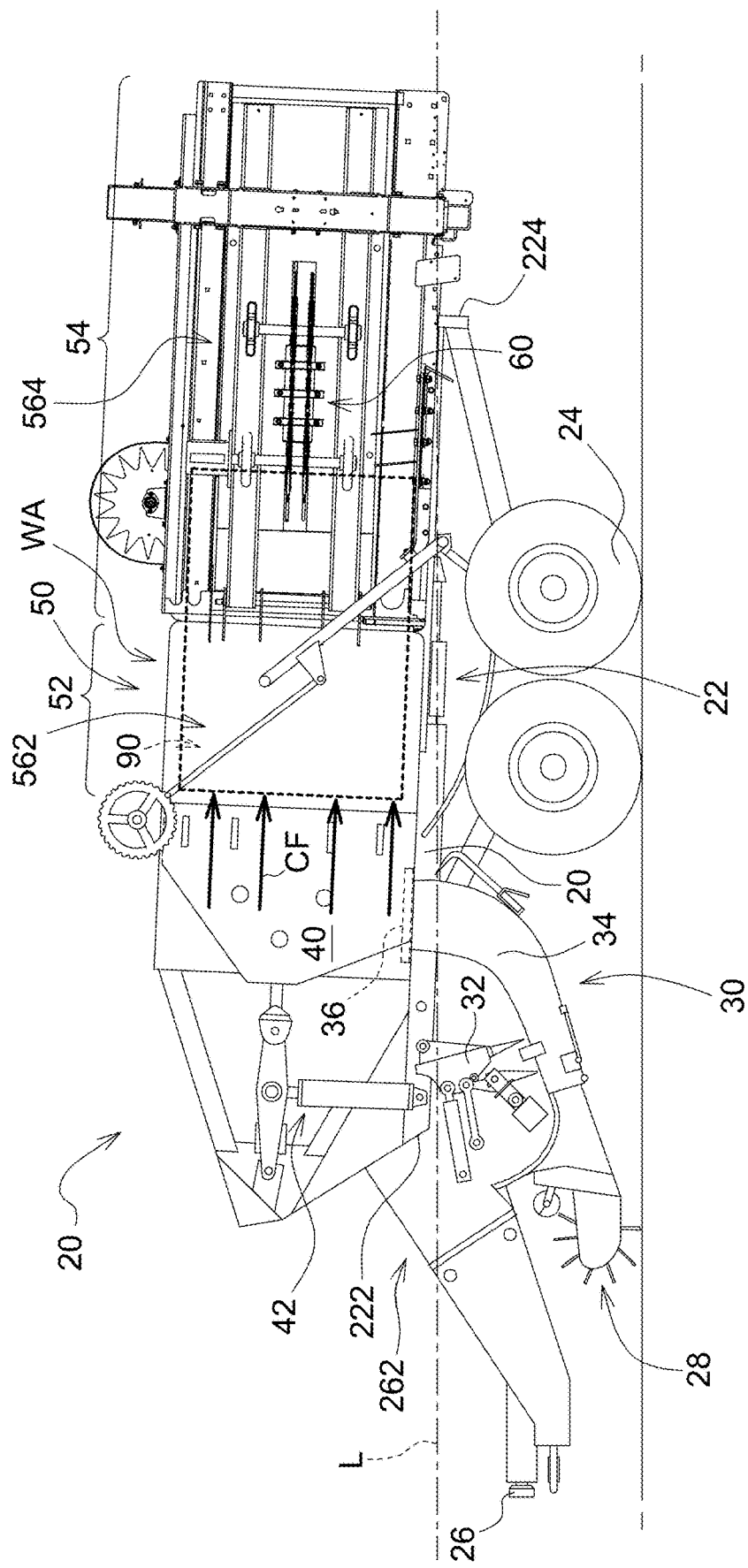
FIG. 1 is a schematic side view of a baler implement.

FIG. 1 illustrates a baler implement 20, such as a square baler, according to one implementation. Although a large square baler is shown, this disclosure also applies to other balers and harvesting machines. The baler implement 20 may be coupled to an agricultural vehicle (not shown), such as a tractor. However, the baler implement 20 may be a self-propelled machine or coupled to another harvesting machine.

The baler implement 20 includes a frame 22, a ground engaging apparatus 24, an input shaft 26, and a pick-up system 28. The frame 22 includes a longitudinal axis L that extends between a forward end 222 and a rearward end 224 of the frame 22 and relative to the direction of travel of the baler implement 20 during operation. The ground engaging apparatus 24 is coupled to the frame 22 and supports the baler implement 20 to travel on the ground surface. The ground engaging apparatus 24 may include wheels, as shown in FIG. 1. However, in another implementation, the ground engaging apparatus 24 is tracked to operate in a rough soil condition. The input shaft 26, such as a power-take-off (PTO) shaft, which can receive rotational power from the agricultural vehicle like tractor or other power sources. The input shaft 26 may connect to an input of the gear train or transmission 262 providing rotational power to the baler implement 20, and a portion of the rotational power may be used to drive a plunger 40, which will be described later. The pick-up system 28 gathers the cut crop, which is a crop material lying on the ground. The pick-up system 28 including, but not limited to, tines, forks, augers, conveyors, baffles, a cutter or pre-cutter assembly, or any combination of the preceding. The pick-up system 28 moves the cut crop upward to a feed system 30 of the baler implement 20.

The baler implement 20 also includes the feed system 30, the plunger 40, and a compression chamber 50. The pick-up system 28 is followed by the feed system 30. The feed system 30 includes feeder forks 32 and a pre-compression chamber 34 (pre-compression channel). The feeder forks 32 illustrated in FIG. 1 are for explanatory purpose; other configuration of protrusions, such as tines, which are operable to be inserted or extended into the pre-compression chamber 34 and swingable or moveable to move the crop material along the pre-compression chamber 34 may have the similar function as the feeder forks 32. The pre-compression chamber 34 is used to temporally store a volume of the crop material (cut crop). The pick-up system 28 directs the cut crop to an inlet of the pre-compression chamber 34. The cut crop builds up within the pre-compression chamber 34 with the pick-up system 28 moving the cut crop to the pre-compression chamber 34. When the crop material accumulates to a fill condition, which may be pre-determined, a door 36 (or inlet of the compression chamber 50) between the pre-compression chamber 34 and the compression chamber 50 is open, and the feeder forks 32 swing to push the crop material into the compression chamber 50.

The plunger 40 is operable to reciprocate within the compression chamber 50 to provide a compressive force CF to compress crop material in the compression chamber 50 into a flake against a plurality of other flakes of a currently forming bale 90 and to move the currently forming bale through the compression chamber 50. The plunger 40 reciprocates within the compression chamber 50 between a first position (shortest retract position) and a second position (longest extension position) via a crank assembly 42. When the plunger 40 is back to the first position, the door 36, as mentioned above previously, opens and the crop material is brought into the compression chamber 50. When the plunger 40 is driven toward the second position, the plunger 40 may compress the crop through the panels 56, which are described in the next paragraph.

Figure 2A:
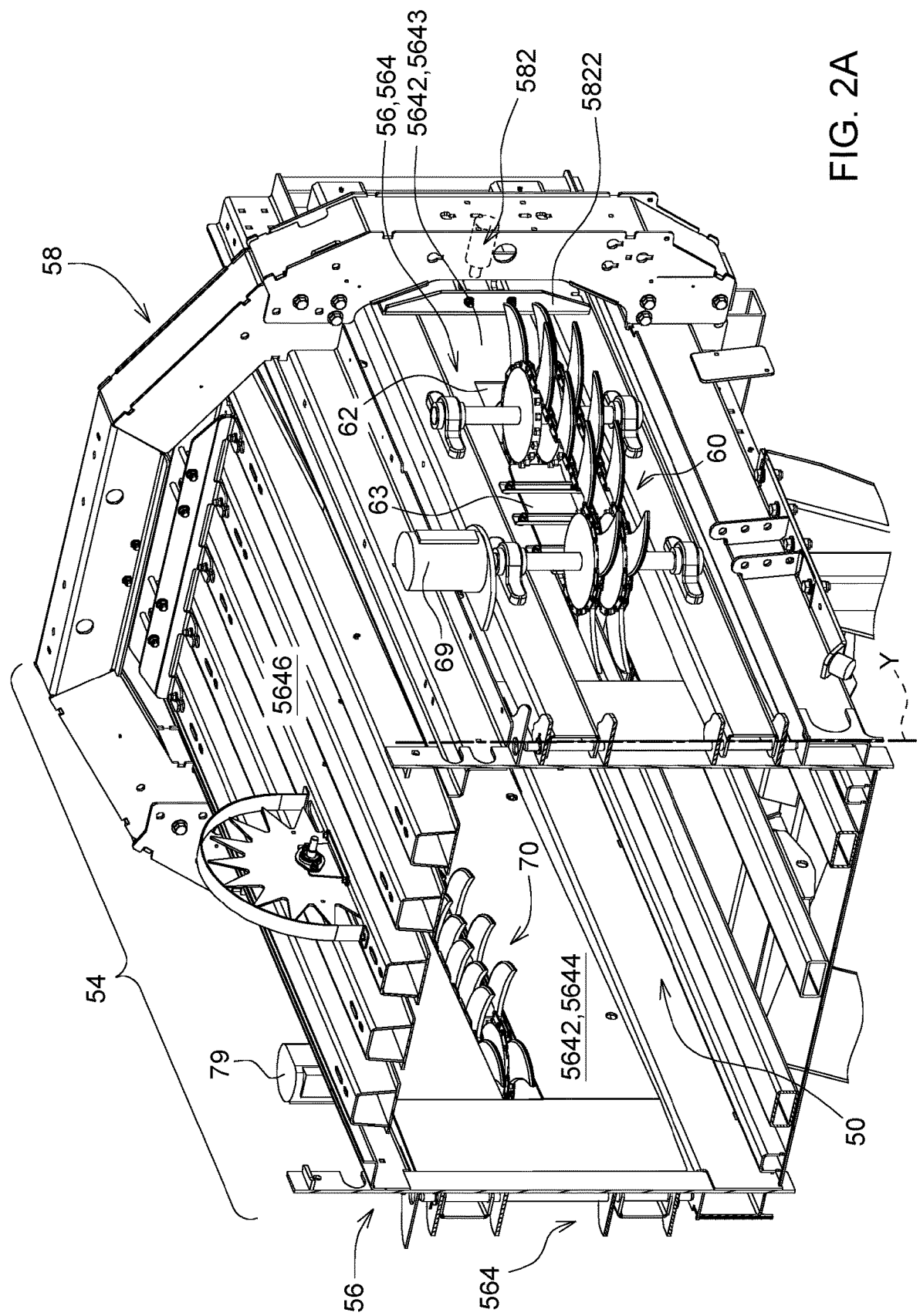
FIG. 2A is a partial perspective view of the baler implement of FIG. 1, showing a first hook mechanism and a second hook mechanism in one implementation coupled to a compression chamber, and a currently forming bale is omitted for clarity.

The baler implement 20 may rely on friction between the currently forming bale 90 and the structures of the compression chamber 50 to generate resistance for packing the currently forming bales 90. The compression chamber 50 may be partially defined by the panels 56. In this implementation, the compression chamber 50 includes a fixed compression zone 52 immediately after the plunger 40, followed by a moveable compression zone 54 where the density of the currently forming bales 90 may be adjusted. The fixed compression zone 52 is at least partially defined by fixed panels 562. The moveable compression zone 54 is at least partially defined by tension panels 564 in various arrangements. In the implementation shown in FIGS. 2A-2C and 3, the tension panels 564 includes two side panels 5642 and a top panel 5646, and the tension panels 564 are surrounded by a hoop 58, which is equipped with actuators 582 configured to selectively push the two side panels 5642 inward against the currently forming bale 90. For example, one of the actuators 582 pivots one of the side panels 5642 about an axis Y. The actuator 528 may include or is coupled to a bracket 5822 that is mounted on that side panel 5642 (e.g., the first panel 5643 as shown in FIG. 2A). Applying more hydraulic or mechanical pressure to the tension panels 564 generates more friction between the currently forming bale 90 being pushed out of the baler implement 20 and the tension panels 564.

One purpose of the tension panels 564 pressing against the crop material in the compression chamber (i.e., the currently forming bale 90) is to maintain a consistency in bale density. Many factors may change the density of the currently forming bale 90. For example, one crop material may have lower coefficients of friction than that of another crop material and the contact between the currently forming bale 90 and the compression chamber 50 may not create sufficient resistance against the compressive force CF from the plunger 40. As such, the density of the currently forming bale 90 may be under the proper value. Therefore, as crop material with lower coefficients of friction are baled, the pressure from the tension panels 564 increases to generate additional resistance (bale density).

However, it is noted that for any given size tension panel, there may be a limit to how much resistance can be generated (surface area) even with maximum pressure in the hydraulic or mechanical tensioning system. This limit may be overcome by additional surface area to engage the crop being pushed out of the compression chamber 50. However, as a result, tension panels 564 may be long with increased pressure limits requiring additional numbers of actuators 582. The present disclosure demonstrates that the baler implement 20 may include a hook mechanism(s) (e.g., the first hook mechanism 60 shown in FIGS. 2A-2C and 3) which allows the baler implement 20 to have more flexible design. For example, the length of the tension panels 564 may be shorter and the number of the actuators 582 may be fewer than another baler implement without the hook mechanism(s). Also, in another implementation, the first hook mechanism 60 may be applied in the fixed compression zone 52 (i.e., on at least one of the fixed panels 562) and/or in the moveable compression zone 54 (i.e., on at least one of the tension panels 564).

As shown in FIG. 2A, two hook mechanisms, i.e., a first hook mechanism 60 and a second hook mechanism 70 are respectively coupled to one of the two opposite side panels 5642. One of the side panels 5642 includes a first panel 5643 where the first hook mechanism 60 is coupled, and the other one of the side panels 5642 includes a second panel 5644 where the second hook mechanism 70 is coupled. In the implementation as shown in FIGS. 2A-2C and 3, the first hook mechanism 60 and the second hook mechanism 70 are similar and for succinct purpose, the description herein focuses on the first hook mechanism 60. It is noted that the hook mechanism(s) may be alternatively referred to as a hook; therefore, the first hook mechanism 60 may be referred to as a first hook and the second hook mechanism 70 may be referred to as a second hook.

Figure 6B:
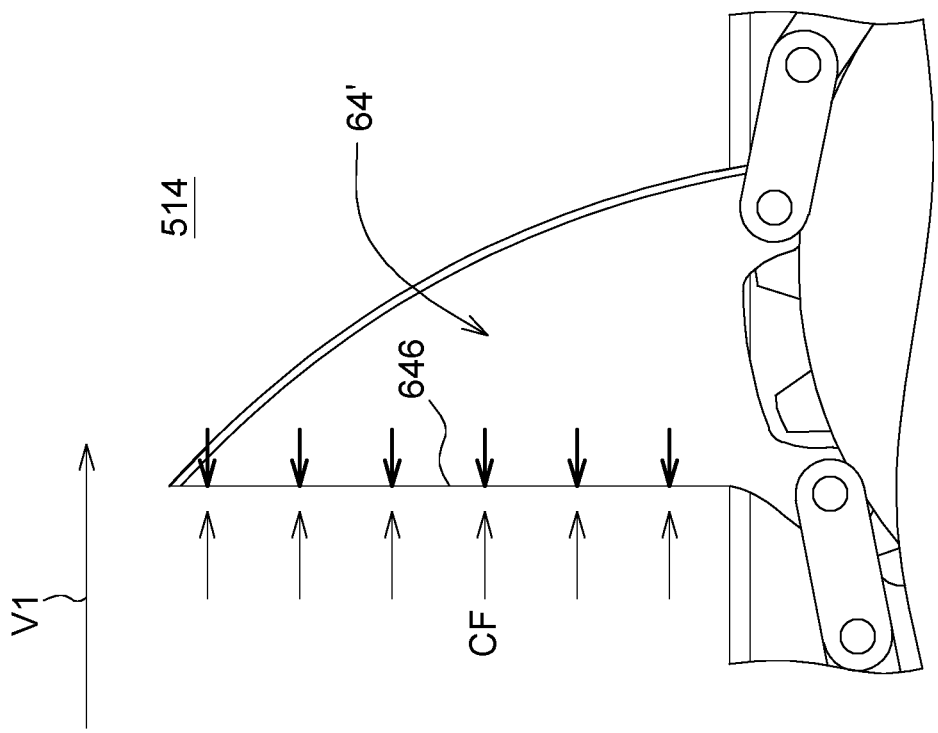
FIG. 6B illustrates one shape of a tooth that has a perpendicular edge holding against a currently forming bale in one implementation.
Figure 6A:
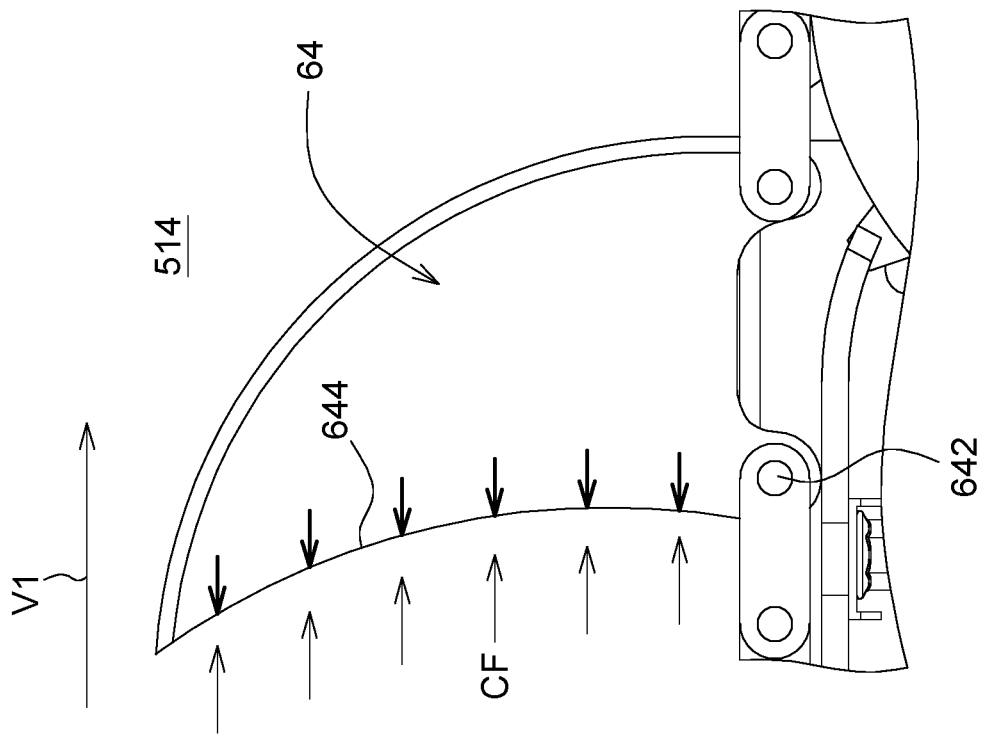
FIG. 6A illustrates one shape of a tooth that has a curved edge holding against a currently forming bale in one implementation.

The first panel 5643 includes a slot 62, which may be a rectangular shape. The slot 62 includes a front edge 622 and a rear edge 624 opposite to the front edge 622 along the central longitudinal axis L. The first hook mechanism 60 includes a plurality of teeth shaped to penetrate the currently forming bale 90 through the slot 62 in the first panel 5643. The number of the teeth herein can be various, and it could be a single tooth or multiple teeth. A first tooth 64 of the teeth is shown in FIGS. 2A-2C and 3 for explanatory purpose. The first tooth 64 travels between the front edge 622 and the rear edge 624 in a first direction V1 with the currently forming bale 90 while resisting movement of the currently forming bale 90. The first direction V1 in this implementation is parallel to the central longitudinal axis L. The first hook mechanism 60 includes a first carrier 662 on which a root 642 of the first tooth 64 is mounted, as shown in FIG. 6A. The first carrier 662 is operable to be pulled by the first tooth 64 traveling along the slot 62. The first hook mechanism 60 includes a first shaft 67 and a second shaft 68, both of which are coupled to the first carrier 662 and spaced apart from each other along the central longitudinal axis L. A cover 63 is positioned between the first shaft 67 and the second shaft 68 and covers a portion of the slot 62, so as to prevent the crop material from leaving the compression chamber 50 through the slot 62. The first shaft 67 is supported by a stand 674 mounted on the first panel 5643 and is rotatable relative to the stand 674. The second shaft 68 is supported by a stand 684 mounted on the first panel 5643 and is rotatable relative to the stand 684. The stand 674 and the stand 684 are generally the same and the distance between the central axis of the first shaft 67 and slot 62 and the distance between the central axis of the second shaft 68 and the slot 62 are substantially the same.

The first carrier 662, in this implementation, includes an endless loop surrounding the first shaft 67 and the second shaft 68. One option for the first carrier 662 in this implementation is a chain. The first shaft 67 and the second shaft 68 may both be vertical. The first shaft 67 may include or is coupled to a first sprocket 672, the second shaft 68 may include or is coupled to a second sprocket 682, and the first carrier 662 surrounds the first sprocket 672 of the first shaft 67 and the second sprocket 682 of the second shaft 68. The first shaft 67 for the first carrier 662 (i.e., chain in this implementation) may be positioned somewhere shortly after the fixed compression zone 52 of the baler implement 20 such that the crop material/currently forming bale 90 pulls the teeth in as it is being compressed by the plunger 40. The second shaft 68 may be positioned somewhere adjacent to the end of the first panel 5643 such that the first tooth 64 can be drawn out of the side of the currently forming bale 90 before it leaves the first panel 5643. The first sprocket 672 and the second sprocket 682 may have the same diameter in this implementation, but in another implementation, the diameter of the first sprocket 672 and the diameter of the second sprocket 682 may be different.

Figure 4A:
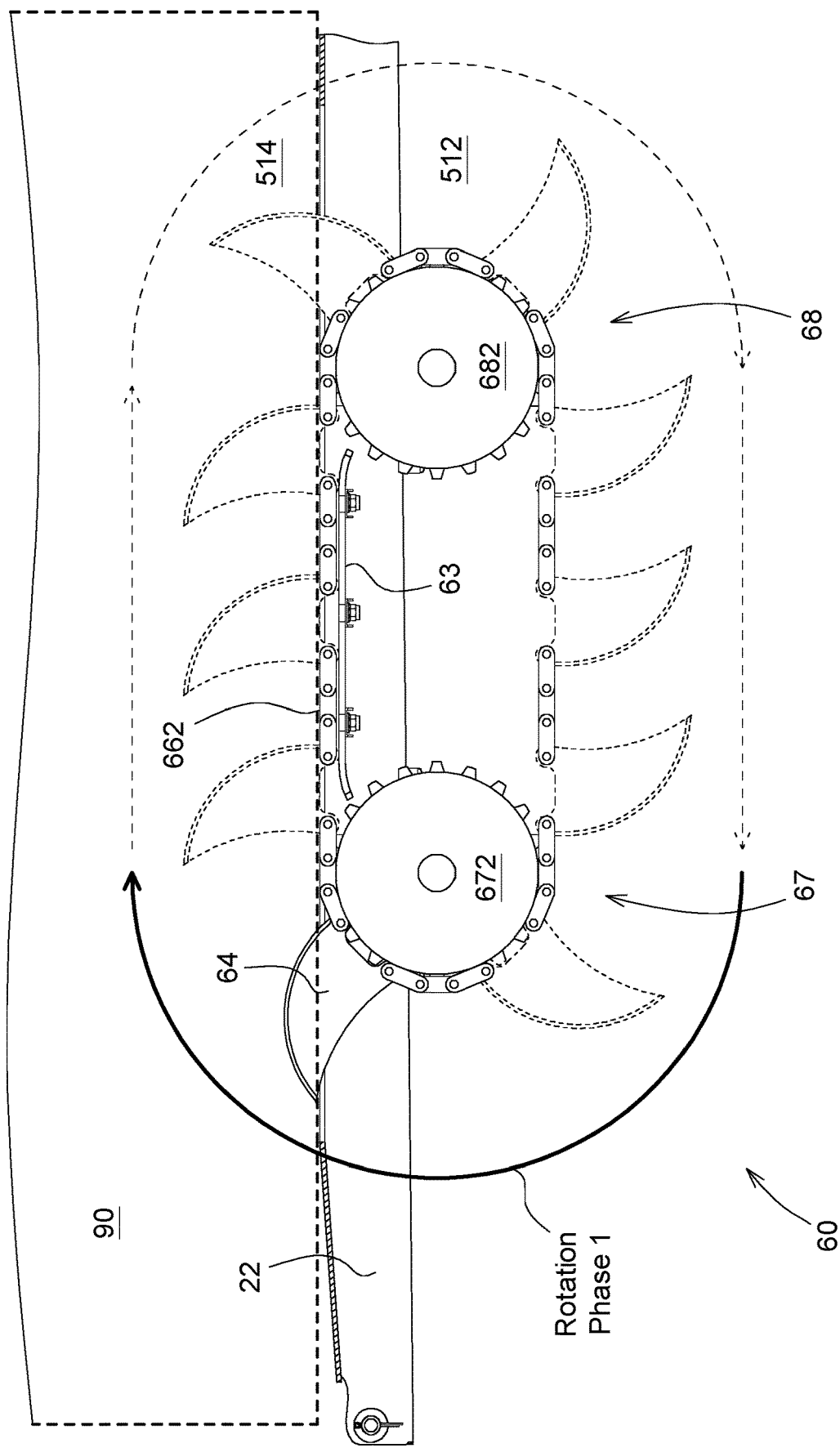
FIG. 4A illustrates a schematic view of a first tooth of the baler implement traveling at a rotation phase 1.

In the implementation shown in FIGS. 2B, 2C, and 4A-4D, since the first carrier 662 is the endless loop surrounding the first shaft 67 and the second shaft 68, the travel of the first tooth 64 is defined by four phases relative to the first shaft 67 and the second 68. The four phases include a rotation phase 1, a translation phase 1, a rotation phase 2, and a translation phase 2. Referring to FIG. 4A that demonstrates the rotation phase 1, the first tooth 64 is moved with the first carrier 662, which may be driven by other teeth amounted thereof, and rotates 180 degrees during a transition from an exterior 512 of the compression chamber 50 to an interior 514 of the compression chamber 50. The first shaft 67 is positioned in back of the front edge 622 of the slot 62 with a distance greater than the thickness of the first carrier 662 and the length of the first tooth 64. As shown in FIG. 4A, the distance between an edge of the first sprocket 672 of the first shaft 67 and the front edge 622 of the slot 62 is greater than the thickness of the first carrier 662 and the length of the first tooth 64. When first tooth 64 is moved, by the travel of the first carrier 662 that is driven by other teeth mounted thereon, from the exterior 512 through the slot 62 into the compression chamber 50, the first tooth 64 gradually penetrates the currently forming bale 90 during the rotation phase 1.

Figure 4B:
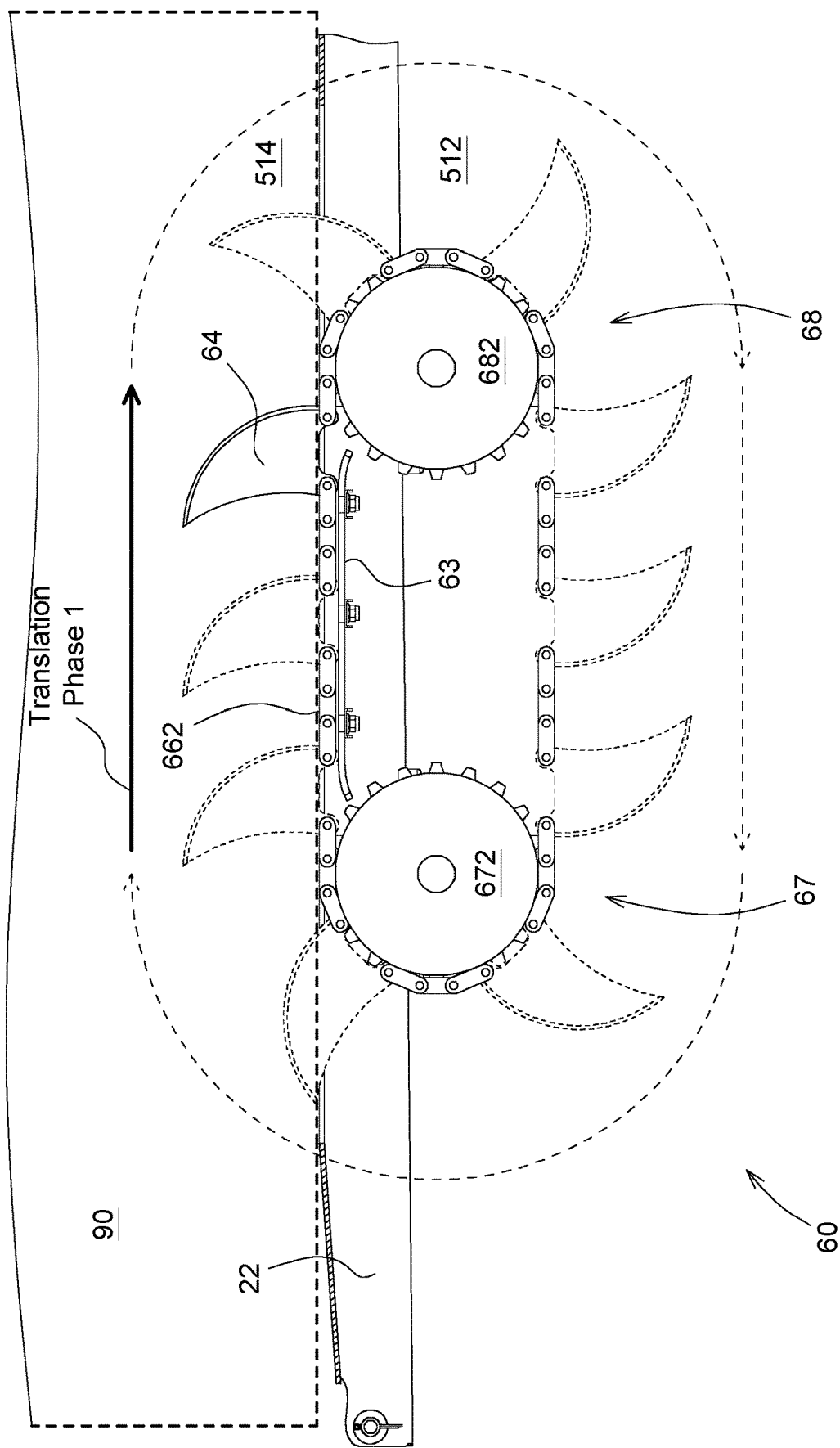
FIG. 4B illustrates a schematic top view of the first tooth of the baler implement traveling at translation phase 1.

Referring to FIG. 4B that shows the translation phase 1, which follows the rotation phase 1, the first tooth 64 penetrates the currently forming bale 90 and is pulled by the currently forming bale 90. During the translation phase 1, the first tooth 64 moves together with the currently forming bale 90 in the first direction V1. A resistance is generated from a resistor 69 and is transferred through the first carrier 662 and the teeth (including the first tooth 64), and to the currently forming bale 90 to increase the density of the currently forming bale 90.

Figure 4C:
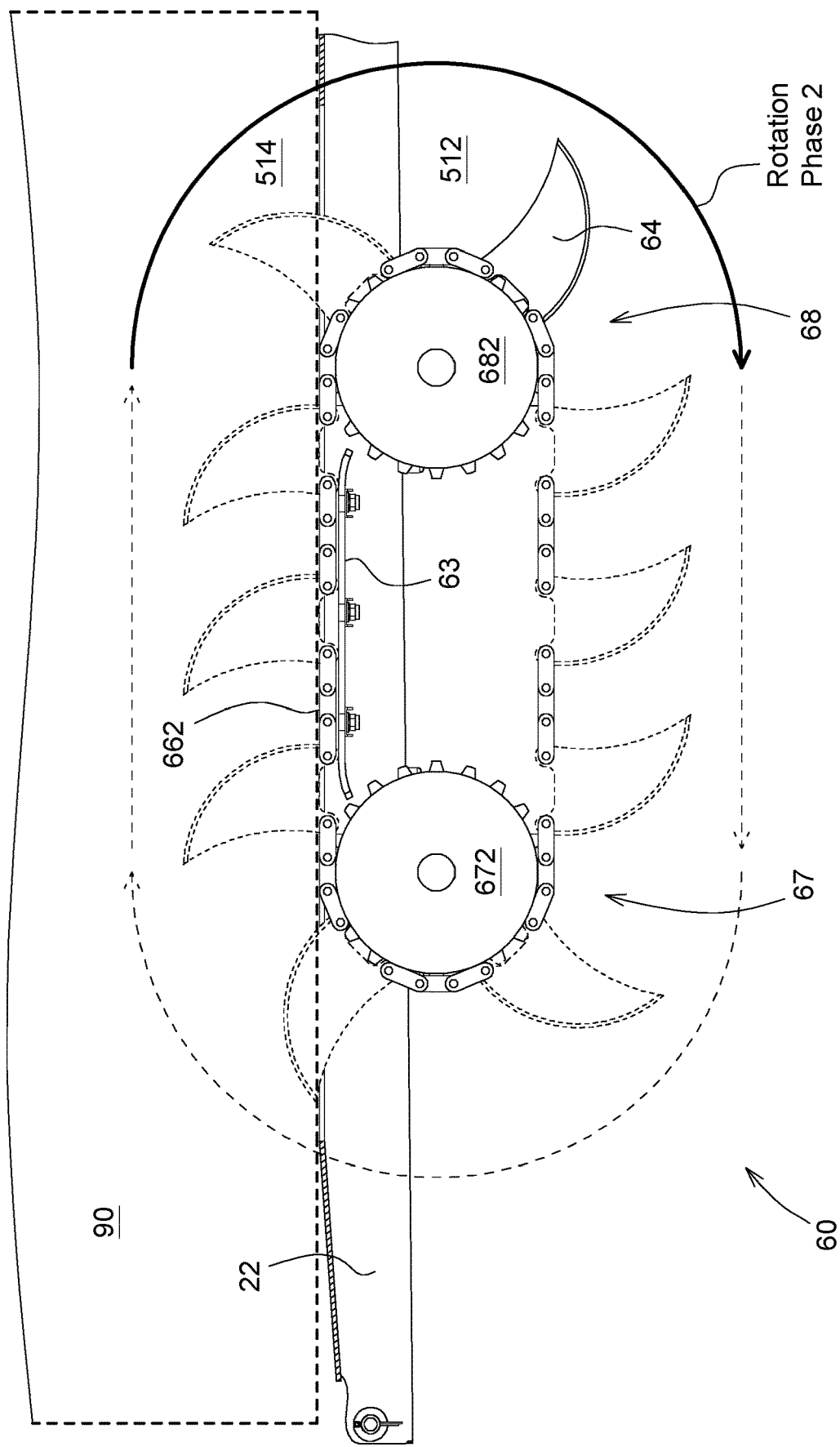
FIG. 4C illustrates a schematic top view of the first tooth of the baler implement traveling at rotation phase 2.
Figure 4D:
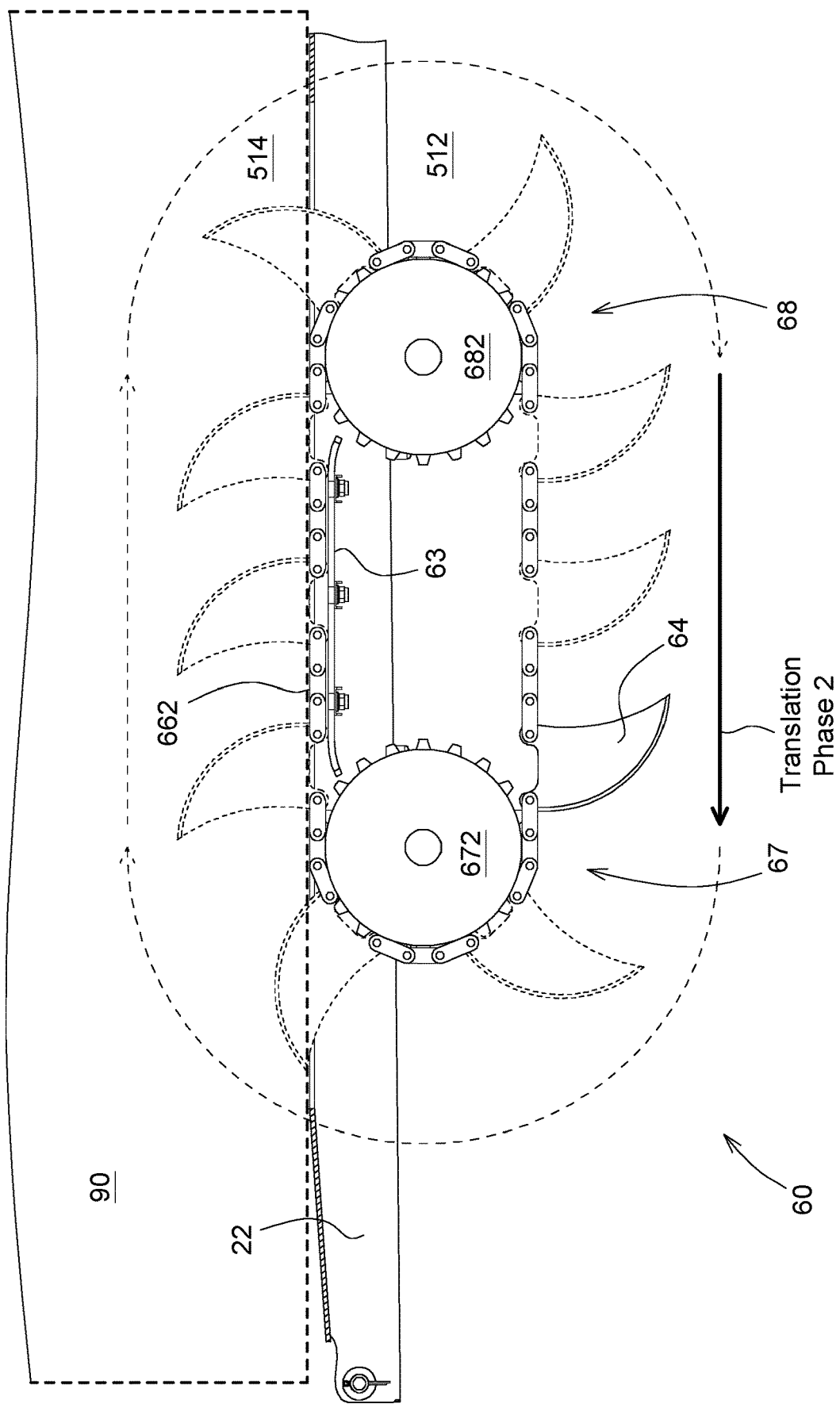
FIG. 4D illustrates a schematic top view of the first tooth of the baler implement traveling at translation phase 2.

Referring to FIG. 4C that shows to the rotation phase 2, which follows the translation phase 1, the first tooth 64 is moved with the first carrier 662, which may be driven by other teeth amounted thereof, and rotates 180 degrees during a transition from the interior 514 of the compression chamber 50 to the exterior 512 of the compression chamber 50. The second shaft 68 is positioned in front of the rear edge 624 with a distance greater than the thickness of the first carrier 662 and the length of the first tooth 64. As shown in FIG. 4D, the distance between an edge of the second sprocket 682 of the second shaft 68 and the rear edge 624 of the slot 62 is greater than the thickness of the first carrier 662 and the length of the first tooth 64. The first tooth 64 is drawn out of the currently forming bale 90 and through the slot 62 to the exterior 512 of the compression chamber 50.

As to the translation phase 2, which follows the rotation phase 2, the first tooth 64 does not engage the currently forming bale 90. During the translation phase 2, the first tooth 64, coupled to the first carrier 662 which is moved by the currently forming bale 90 via other teeth, travels in the direction opposite to the first direction V1. With the first tooth 64 and other teeth travel during different phases, the first hook mechanism 60 can engage and disengage with the currently forming bale 90 smoothly.

As shown in FIGS. 2A-2C, 3, 5A, and 5B, the first hook mechanism 60 includes a second carrier 664 and a second tooth 65 shaped to penetrate the currently forming bale 90 through the slot 62 in the first panel 5643. Like the first carrier 662 carrying multiple teeth, including the first tooth 64, the second carrier 664 also carries multiple teeth, including the second tooth 65. The second tooth 65 described herein is for explanatory purpose, and other teeth mounted on the second carrier 664 may be configured in a similar structure to the second tooth 65. The root 652 of the second tooth 65 is mounted on the second carrier 664. The second carrier 664 is partially pulled by the second tooth 65 traveling along the slot 62. The first carrier 662 and the second carrier 664 may run parallel to each other. The relative positions between the teeth of the first carrier 662 and the teeth of the second carrier 664 may be various. In one implementation of the teeth arrangement, as shown in FIG. 5A, the teeth of the first carrier 662 and the teeth of the second carrier 664 are stacked. In another implementation of the teeth arrangement, as shown in FIG. 5B, the teeth of the first carrier 662 and the teeth of the second carrier 664 are offset.

The shape of the first tooth 64 may be various. For example, FIG. 6A illustrates one shape of the first tooth 64 that has a curved edge 644 holding against the currently forming bale 90 when the first tooth 64 is at the translation phase 1. The first tooth 64 is a hook shape with the curved edge 644 facing opposite the direction of movement of the currently forming bale 90 in the compression chamber 50. In another example, FIG. 6B illustrates one shape of a first tooth 64' that has a perpendicular edge 646 holding against the currently forming bale 90 when the first tooth 64 is at the translation phase 1.

Figure 3:
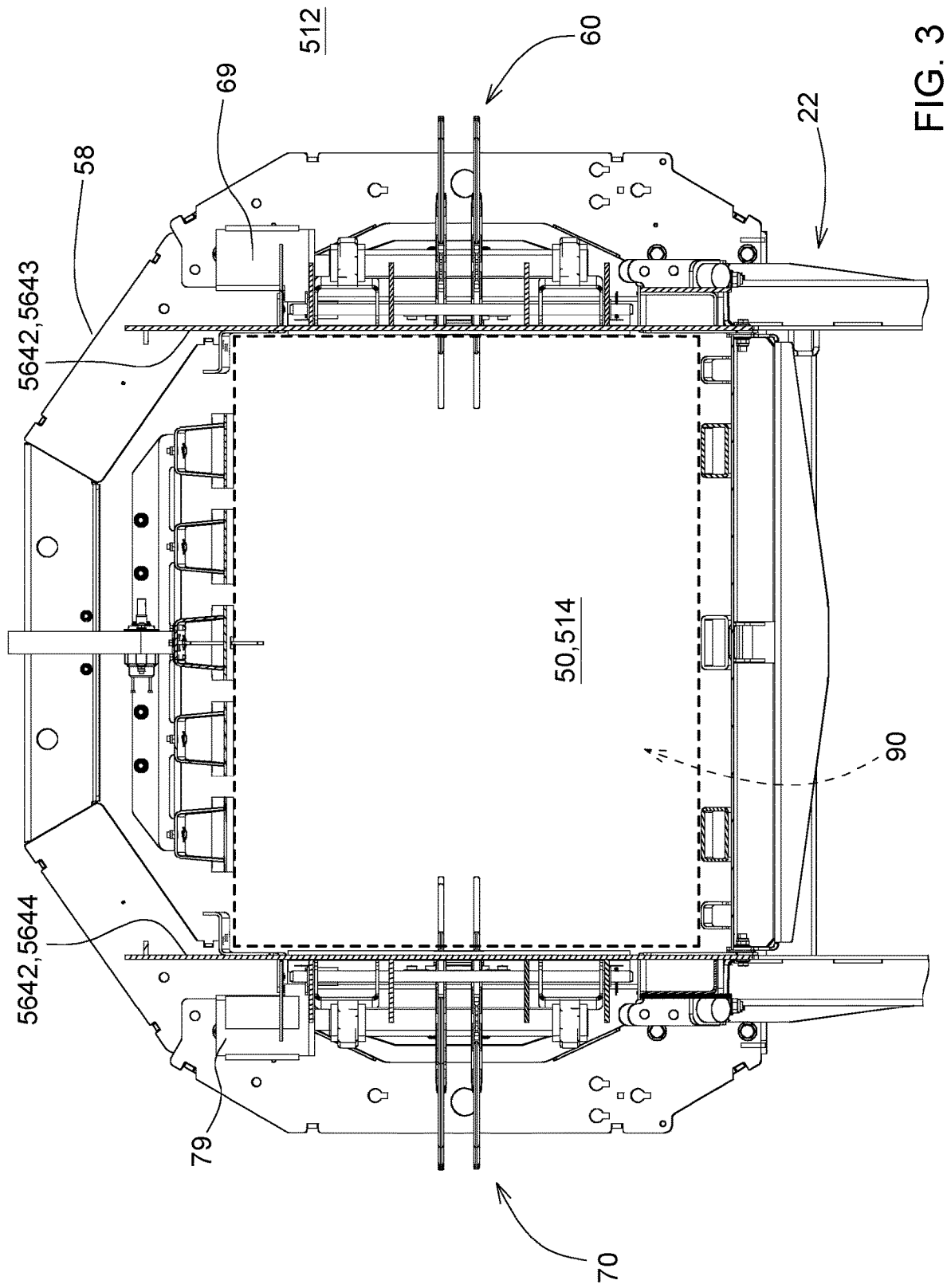
FIG. 3 is a front view of a moveable compression zone of the baler implement of FIG. 1.

Referring to FIGS. 1, 2A and 3, the second panel 5644 is partially forming the compression chamber 50, and the second hook mechanism 70 is positioned on the second panel 5644. Like the first hook mechanism 60, the second hook mechanism 70 is operable to engage the currently forming bale 90 inside the compression chamber 50 to resist the compressive force CF applied by the plunger 40. The first panel 5643 and the second panel 5644 are positioned on opposite sides across the currently forming bale 90. The first hook mechanism 60 and the second hook mechanism 70 may be symmetric along the longitudinal axis L with similar configurations, such that the first hook mechanism 60 and the second hook mechanism 70 is configured to provide substantially equal resistance on the currently forming bale 90 against the compressive force CF. The first hook mechanism 60 and the second hook mechanism 70 may also provide different resistance against the currently forming bale 90, which is described later with FIGS. 7A and 7B.

Figure 7A:
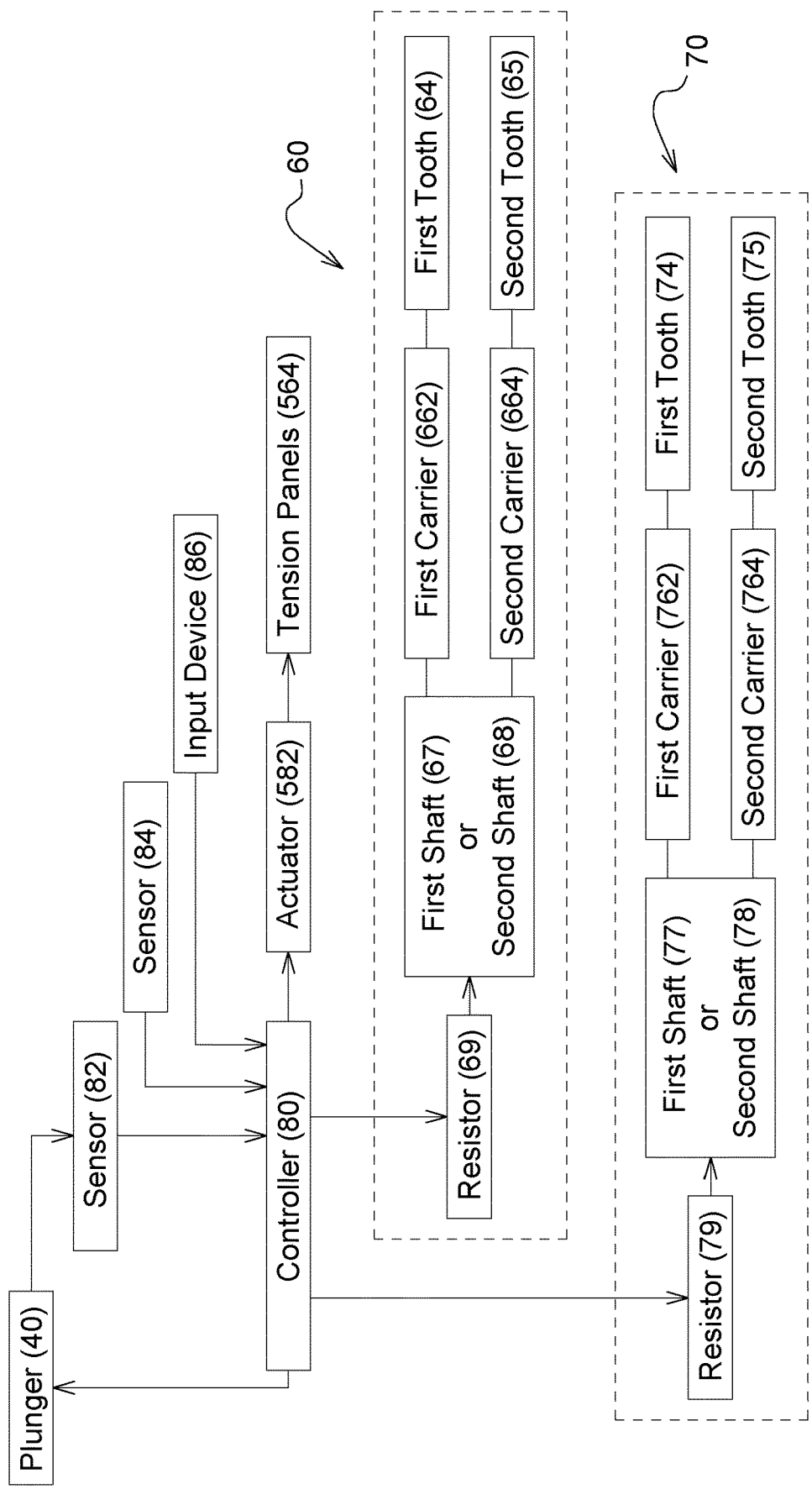
FIG. 7A is a block diagram illustrates a system configured to adjust or maintain the density of the currently forming bale.

Referring to FIGS. 2A and 7A, at least one of the first shaft 67 and second shaft 68 is coupled to the resistor 69 of the first hook mechanism 60, which is a rotational resistor, to transfer the resistance from the resistor 69 to the first carrier 662 and then to the currently forming bale 90. In the present implementation, the first shaft 67 is coupled to the resistor 69, which is a rotationally resistive device such as a hydraulic retarder, friction brake, electric motor, magnetic resistive device, or other means of generating resistance to a torsional load. The resistance generated by the first carrier 662 and the second carrier 664 (crop chain) can be controlled by increasing or decreasing the resistance provided by the resistor 69 (rotational resistive device). The resistor 69 is coupled to one of the first panel 5643 or the frame 22. The resistor 69 is controllable to provide an adjustable resistive force on one side of the currently forming bale 90, via the teeth mounted on the first carrier 662, including the first tooth 64, of the first hook mechanism 60, against the compressive force CF applied by the plunger 40 to increase a density of the currently forming bale 90. Similarly, a resistor 79 in the second hook mechanism 70 is coupled to one of the second panel 5644 or the frame 22 and is controllable to provide an adjustable resistive force on the opposite side of the currently forming bale 90. The baler implement 20 may include a wrapping assembly WA operable to encircle the currently forming bale 90 with a twine to form a completed bale. The sides of the currently forming bale 90 against which the first hook mechanism 60 and the second hook mechanism 70 engage are different from the sides of the currently forming bale 90 on which the wrap of the wrapping assembly WA encircles the currently forming bale 90. For example, the wrap encircles the currently forming bale 90, which may be a rectangular prism, on the front, rear, top and bottom surfaces of the currently forming bale 90. The first hook mechanism 60 and the second hook mechanism 70 engage against the sides surfaces that are corresponding to the side panels 5642. In some implementation (not shown), the wrapping assembly WA may be operable to wrap the currently forming bale 90 to form a completed bale via a plurality of knotter twines arranged parallel to each other, and one of the sides of the currently forming bale 90 on which the wrapping assembly WA ties and the side of the currently forming bale 90 to which a third hook mechanism (not shown, in another implementation) engages is the same, for example, the top surface of the currently forming bale 90. The third hook mechanism engages the currently forming bale between an adjacent pair of the plurality of knotter twines.

In regard to adjustment of the resistance between the panels 56 of the compression chamber 50, the baler implement 20 may include a controller 80 and a sensor 82, a sensor 84, and an input device 86 as shown in FIG. 7A. The controller 80 is disposed in communication with the sensor 82, the sensor 84, the input device 86, the actuator 582 operable to press, move, or pivot the tension panels 564, the resistor 69, the resistor 79, etc. While the controller 80 is generally described herein as a singular device, it should be appreciated that the controller 80 may include multiple controllers linked together to share and/or communicate information therebetween. Furthermore, it should be appreciated that the controller 80 may be located on the baler implement 20 or located remotely from the baler implement 20.

The controller 80 may alternatively be referred to as a computing device, a computer, a control unit, a control module, a module, etc. The controller 80 includes a processor, a memory, and all software, hardware, algorithms, connections, sensors, etc., necessary to manage and control the operation of the sensor 82, the sensor 84, the input device 86, an actuator (not shown) to control the plunger 40, the actuator 582 that presses the tension panels 564, the resistor 69, and the resistor 79. As such, a method may be embodied as a program or algorithm operable on the controller 80. It should be appreciated that the controller 80 may include any device capable of analyzing data from various sensors, comparing data, making decisions, and executing the required tasks.

As used herein, "controller 80" is intended to be used consistent with how the term is used by a person of skill in the art, and refers to a computing component with processing, memory, and communication capabilities, which is utilized to execute instructions (i.e., stored on the memory or received via the communication capabilities) to control or communicate with one or more other components. In certain embodiments, the controller 80 may be configured to receive input signals in various formats (e.g., hydraulic signals, voltage signals, current signals, CAN messages, optical signals, radio signals), and to output command or communication signals in various formats (e.g., hydraulic signals, voltage signals, current signals, CAN messages, optical signals, radio signals).

The controller 80 may be in communication with other components on the baler implement 20, such as hydraulic components, electrical components, and operator inputs within an operator station of an associated work vehicle. The controller 80 may be electrically connected to these other components by a wiring harness such that messages, commands, and electrical power may be transmitted between the controller and the other components. Although the controller is referenced in the singular, in alternative embodiments the configuration and functionality described herein can be split across multiple devices using techniques known to a person of ordinary skill in the art.

The controller may be embodied as one or multiple digital computers or host machines each having one or more processors, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and any required input/output (I/O) circuitry, I/O devices, and communication interfaces, as well as signal conditioning and buffer electronics.

The computer-readable memory may include any non-transitory/tangible medium which participates in providing data or computer-readable instructions. The memory may be non-volatile or volatile. Non-volatile media may include, for example, optical or magnetic disks and other persistent memory. Example volatile media may include dynamic random access memory (DRAM), which may constitute a main memory. Other examples of embodiments for memory include a floppy, flexible disk, or hard disk, magnetic tape or other magnetic medium, a CD-ROM, DVD, and/or any other optical medium, as well as other possible memory devices such as flash memory.

The controller 80 includes the tangible, non-transitory memory on which are recorded computer-executable instructions, including different algorithms. The processor(s) of the controller 80 is configured for executing the algorithms. The algorithms may implement a method of adjusting the compressive force CF of the plunger 40, a method of changing the pressing force from the tension panels 564, a method of controlling the resistor 69 and/or the resistor 79 to increase resistance to a torsional load, and a method of differentiating the adjustable resistive force from the resistor 69 of the first hook mechanism 60 and the adjustable resistive force from the resistor 79 of the second hook mechanism 70 to change the shape or density of the currently forming bale 90 described in detail below.

The algorithms configured to decide an appropriate movement of the actuators (e.g., actuator 582) to change the pressing force against the currently forming bale 90 in the compression chamber 50 or configured to adjust the rotational resistance of the resistor 69 and/or the resistor 79. The resistor 69, as described previously, is coupled to the first shaft 67 or second shaft 68. In the implementation shown in FIG. 2 the resistor 69 is coupled to the first shaft 67. The controller 80 may also control the actuator (e.g., an input of the gear train or transmission) of the plunger 40, through the algorithms, to adjust the compressive force CF of the plunger 40. The sensor 82 is coupled to a portion of the plunger 40 and is operable to measure a characteristic of a portion of the plunger 40 and to transmit a signal indicative of the characteristic of the portion of the plunger 40. This this implementation, the sensor 82 may be positioned on the crank assembly 42 of the plunger 40 but the sensor 82 could be mounted on any other portion of the plunger 40 to detect the characteristic of the plunger 40. The sensor 82 may include a load cell sensor that coverts an input mechanical force such as compression, torque, pressure, or other characteristic on the crank assembly 42 to an electric output signal (the signal indicative of the characteristic of the portion of the plunger 40) that is received by the controller 80. The input mechanical force is generated from the reaction from the currently forming bale 90, when the compressive force CF is applied to the currently forming bale 90.

Through the signal indicative of the characteristic of the portion of the plunger 40, a closed loop control of the compressive force CF (plunger force) may still be maintained even though the currently harvested crop material is different from previously harvested crop material, or the current crop condition is different crop condition. For example, when the sensor 82 detects the input mechanical force is lower than a pre-determined value that is saved in the memory coupled to the controller 80, the controller 80 may determine to increase the resistance between the currently forming bale 90 and the panels 56 of the compression chamber 50 such as tension panels 564. The controller 80 may control the tension panels 564 to press against the currently forming bale 90. Alternatively, or additionally, the controller 80 may control the resistor 69 to increase resistance to a torsional load, such that the teeth (including the first tooth 64) of the first carrier 662 and the teeth (including the second tooth 65) of the second carrier 664 provides or increase the resistance in the direction opposite the first direction V1. Similar structures of the first tooth 64, the second tooth 65, the first carrier 662, the second carrier 664, the first shaft 67, the second shaft 68, and the resistor 69 herein may be applied to the different hook mechanism(s). For example, the second hook mechanism 70 may include the first tooth 74, the second tooth 75, the first carrier 762, the second carrier 764, the first shaft 77, the second shaft 78, and the resistor 79. The controller 80 may also control the resistor 79 to increase resistance to a torsional load, such that the teeth of the first carrier 762 and the teeth of the second carrier 764 provides or increase the resistance in the direction opposite the first direction V1. The second hook mechanism 70 may engage with one side the currently forming bale 90 different from the side which the first hook mechanism 60 engages. The increased resistance against the compressive force CF applied by the plunger 40 increases the compression of the crop material (flake) within the compression chamber 50. Therefore, it may not be necessary to substantially decrease the compressive force CF from the plunger 40. The density of the currently forming bale 90 can be maintained. In another implementation, where there is no actuator 582 and tension panels 564, and the controller 80 may control the resistors like resistor 69 and/or resistor 79 of the hook mechanism(s) to increase the resistance between the currently forming bale 90 and the panels 56 of the compression chamber 50, based on the signal indicative of the characteristic of the portion of the plunger 40.

Figure 2B:
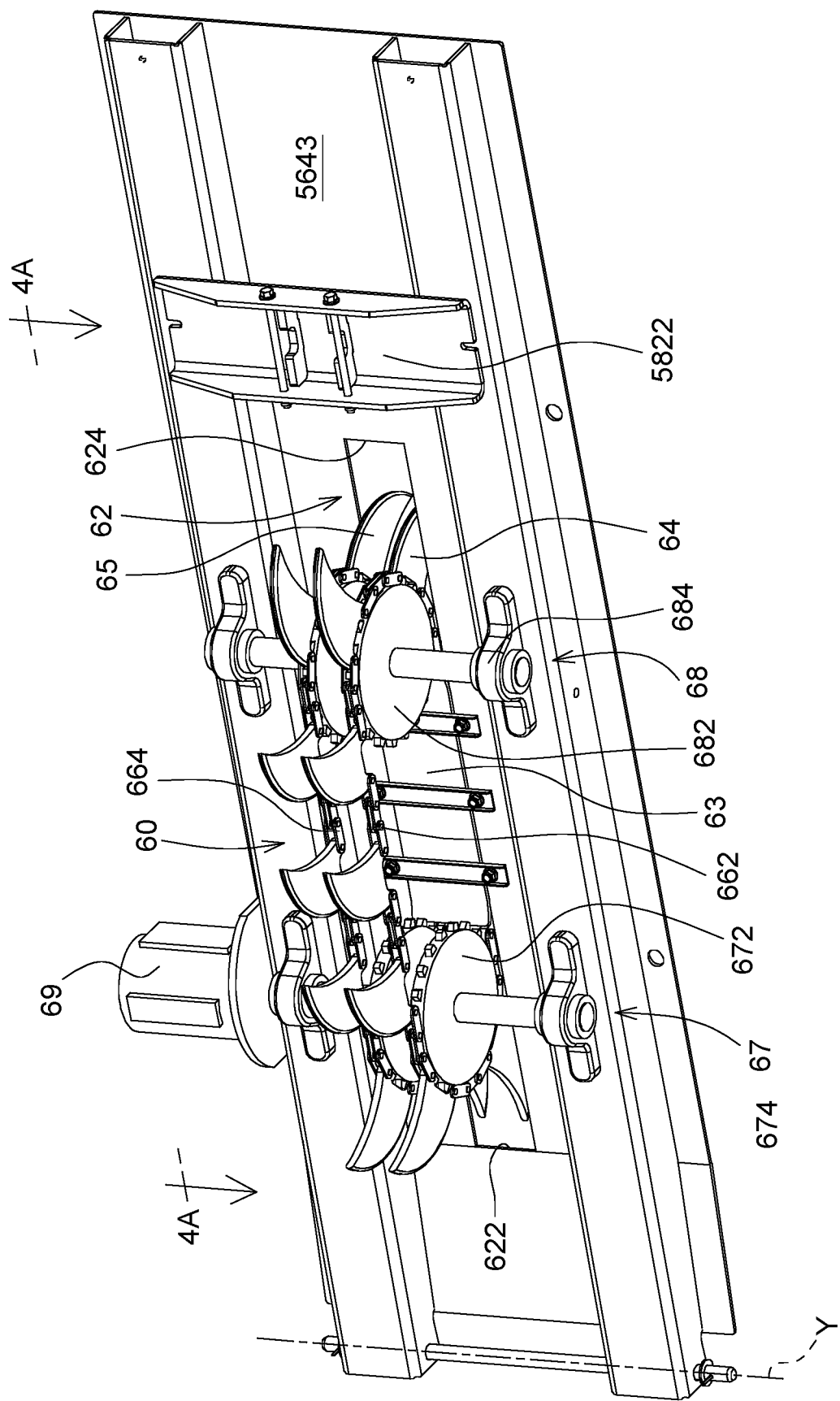
FIG. 2B is an enlarged view of the first hook mechanism in an exterior of the compression chamber of FIG. 2A.
Figure 2C:
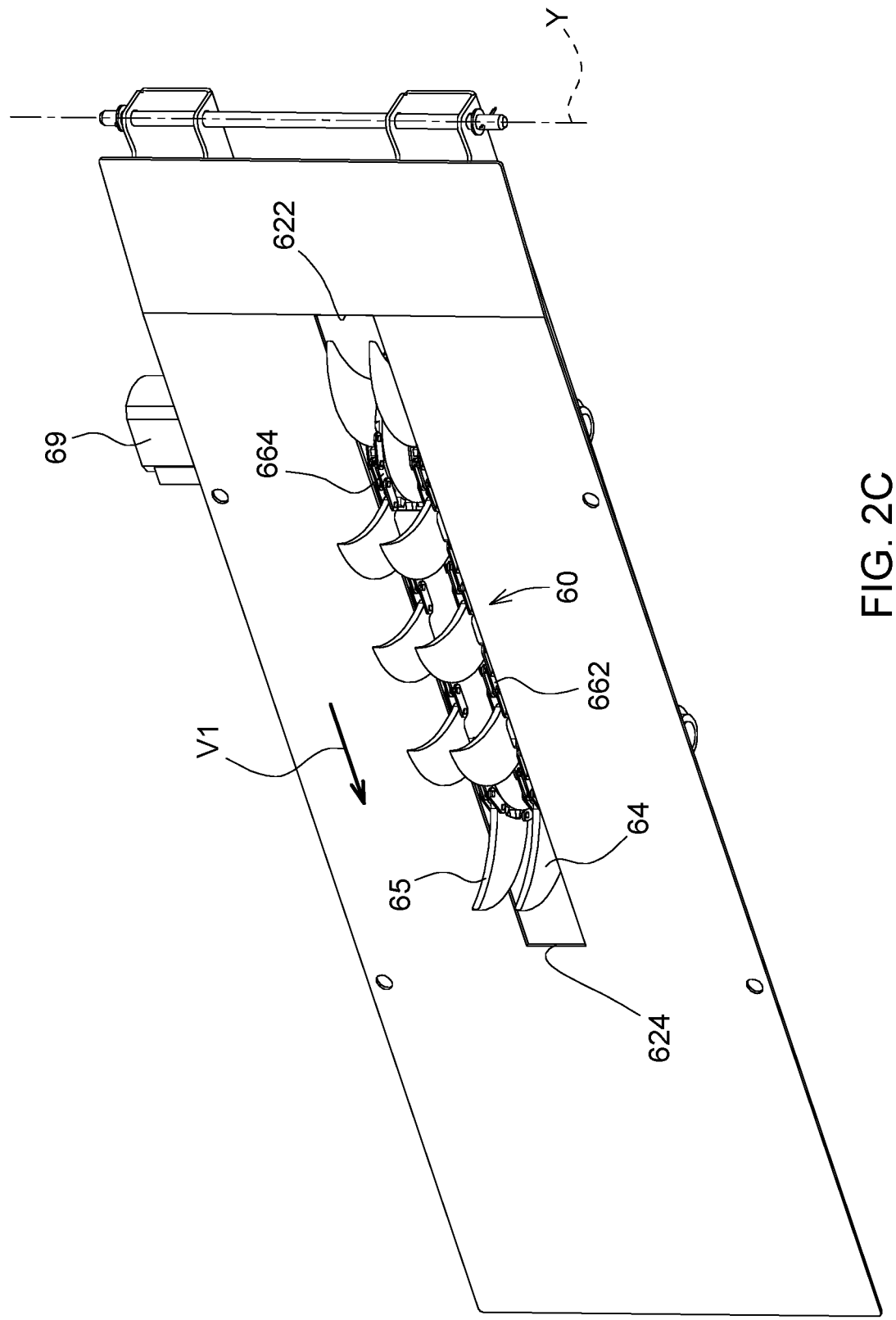
FIG. 2C is an enlarged view of the first hook mechanism in an interior of the compression chamber of FIG. 2A.
Figure 7B:
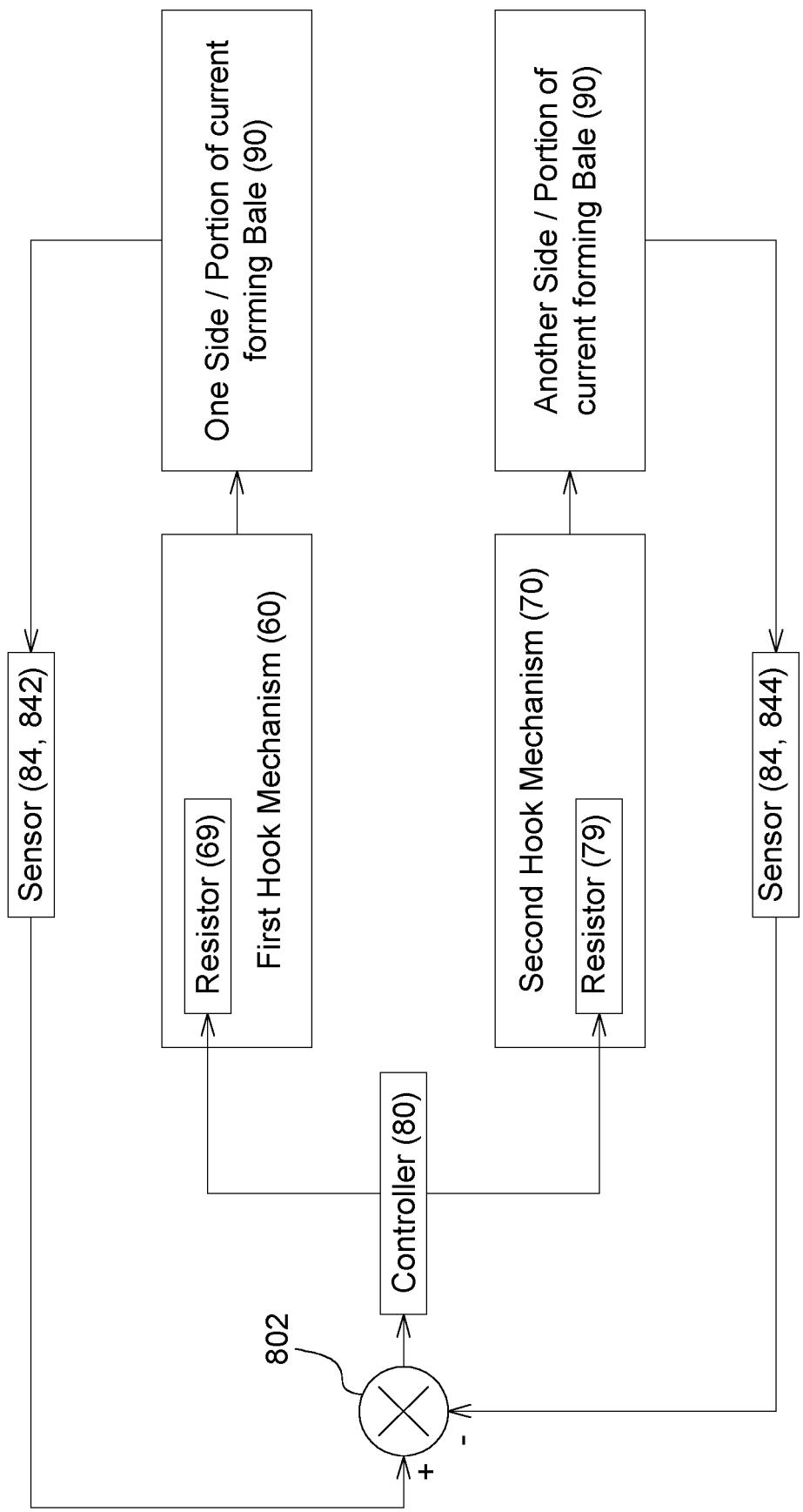
FIG. 7B is a block diagram illustrates a closed loop control system where the first hook mechanism and the second hook mechanism configured to cooperate to control the shape or density distribution of the currently forming bale.

It is noted that when there are more than one hook mechanisms, such as the first hook mechanism 60 and the second hook mechanism 70 as shown in FIG. 2B, the shape or distribution of the density of the currently forming bale 90 may be adjusted. Referring to FIG. 7A, the sensor 84 is coupled to the controller 80. The sensor 84 is operable to measure a characteristic of the currently forming bale 90 and to transmit a signal indicative of the characteristic of the currently forming bale 90. The sensor 84 may include a sensor 842 to measure the characteristic of the side/portion of the currently forming bale 90 adjacent to the first panel 5643 and a sensor 844 to measure the characteristic of the side/portion of the currently forming bale 90 adjacent to the second panel 5644. The sensor 842 and the sensor 844, each of which may be a weigh sensor to measure a portion of the weight of the currently forming bale 90, for the controller 80 to calculate the distribution of the density of the currently forming bale 90 between the first sensor 842 and second sensor 844. The sensors 842, 844 can be other type of sensors operable to transmit signals to the controller 80 to determine the shape and/or the density of the currently forming bale 90. The controller 80 is operable to differentiate the adjustable resistive force from the resistor 69 of the first hook mechanism 60 and the adjustable resistive force from the resistor 79 of the second hook mechanism 70, based on the signal indicative of the characteristic of the currently forming bale 90 when the shape of the density of the currently forming bale 90 is needed to be adjusted. Referring to FIG. 7B, a closed loop control system where the first hook mechanism 60 and the second hook mechanism 70 are configured to cooperate to control the shape or density distribution of the currently forming bale 90 is disclosed. For one example, when the controller 80 receives the signals from the sensor 842 and sensor 844 and determines that a portion of the currently forming bale 90 near the side of the currently forming bale 90 engaged with the first hook mechanism 60 (or first panel 5643) is looser than a portion near the side of the currently forming bale 90 engaged with the second hook mechanism 70, the controller 80 may control the resistor 69 to increase resistance to the torsional load to increase the density of the portion near the side of the currently forming bale 90 where the first hook mechanism 60 engages and/or control the resistor 79 to decrease the torsional load to decrease the density of the portion near the side of the currently forming bale 90 where the second hook mechanism 70 engages. A summing point 802 (e.g., error detector) may be coupled to or included by the controller 80, perform the subtraction of the values detected from the sensor 842 and sensor 844 and provide output that is used to determine different torsional loads of the resistor 69 and resistor 79. Increasing or decreasing the resistance on a per-side basis of the currently forming bale 90 could adjust for inconsistent windrow shape or operator driving and still produce a straight square bale.

It is noted that based on the above-mentioned example, the controller 80 may utilize the signals from the sensor 82 and sensor 84 (including the sensors 842, 844) altogether to control the first hook mechanism 60 and the second hook mechanism 70. The controller 80 may control the resistor 69 to increase resistance to the torsional load and control the resistor 79 to decrease the torsional load or only control the resistor 69 to increase resistance to the torsional load without decreasing the torsional load of the resistor 79, depending on the whether the input mechanical force detected by the sensor 82 is lower than the pre-determined value. If the input mechanical force detected by the sensor 82 is lower than the pre-determined value, the controller 80 may not decrease the torsional load of the resistor 79 but may only increase the torsional load of the resistor 69, to ensure the portion of the currently forming bale 90 near the side where the second hook mechanism 70 engages has sufficient density.

The baler implement 20 may have the input device 86 that is operable to transmit a signal to control the first hook mechanism 60 and the second hook mechanism 70. The input device 86 may include a lever, joystick, touch panel, button, or other format coupled to the controller 80, which is operable to differentiate the adjustable resistive force from the resistor 69 of the hook mechanism 60 and the adjustable resistive force from the resistor 79 of the second hook mechanism 70 based on the signal from the input device 86. The sensor 84 may include a camera. The operator may observe the shape of the currently forming bale 90 through the sensor 84 and change the shape and density of the currently forming bale 90 through the input device 86.

Referring to FIGS. 8A-9A, another implementation of a first hook mechanism 60' is disclosed. The difference between the implementation shown in FIGS. 2B and 8B is that a first hook mechanism 60' in FIG. 8B includes a ramp configuration that is formed by a first shaft 67' and a second shaft 68' relative to the first panel 5643. The first shaft 67' is supported by a stand 674' mounted on the first panel 5643 and is rotatable relative to the stand 674'. The second shaft 68' is supported by a stand 684' mounted on the first panel 5643 and is rotatable relative to the stand 684'. The stand 674' and the stand 684' are generally the different. A connection point P1 of the first shaft 67' on the stand 674' is more outward than a connection point P2 on the stand 684'. As shown in FIG. 8B, the distance between the central axis of the first shaft 67' and slot 62 is longer than the distance between the central axis of the second shaft 68' and the slot 62. Because of the ramp configuration, each tooth of the first carrier 662 in the translation phase 1 penetrates the currently forming bale 90 in different extents. The first tooth 74 penetrates into the currently forming bale 90 through the slot 62 in different extent when the first tooth 74 travels from the front edge 622 to the rear edge 624 of the slot 62. The first sprocket 672' and the second sprocket 682' may have the same diameter in this implementation.

Figure 8A:
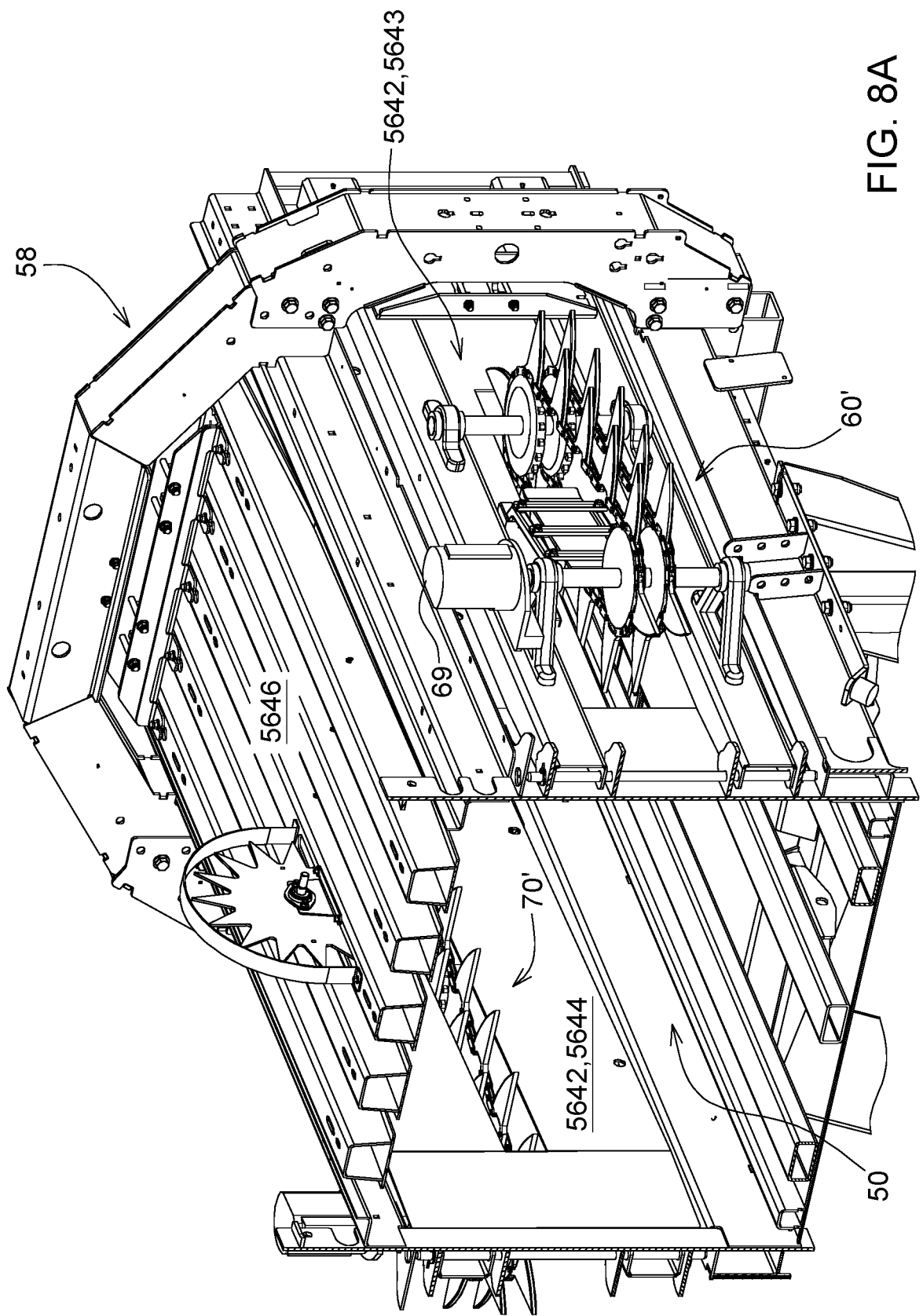
FIG. 8A is a partial perspective view of the baler implement, showing the first hook mechanism and the second hook mechanism in another implementation coupled to the compression chamber.
Figure 8B:
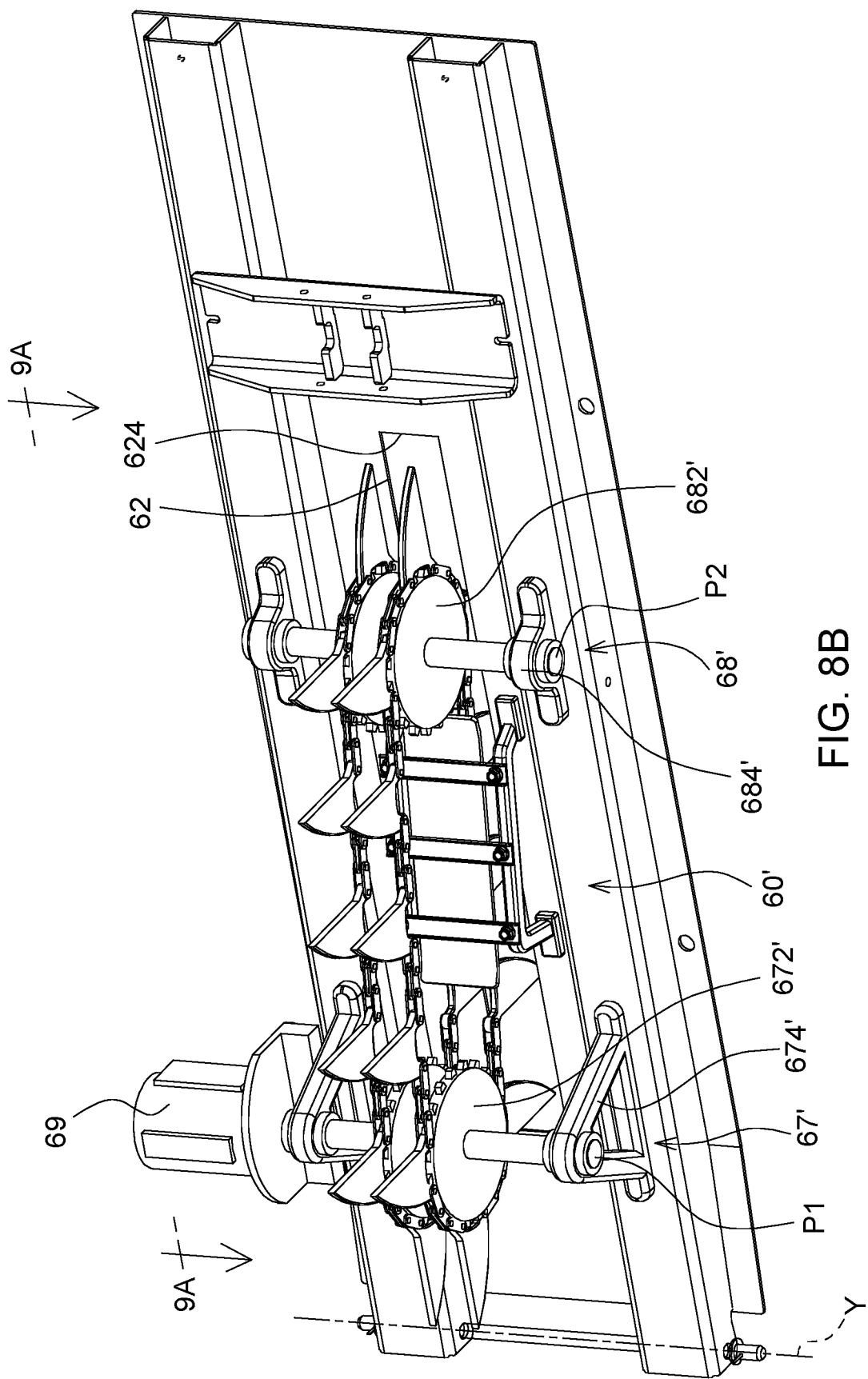
FIG. 8B is an enlarged view of the first hook mechanism in an exterior of the compression chamber of FIG. 8A.
Figure 8C:
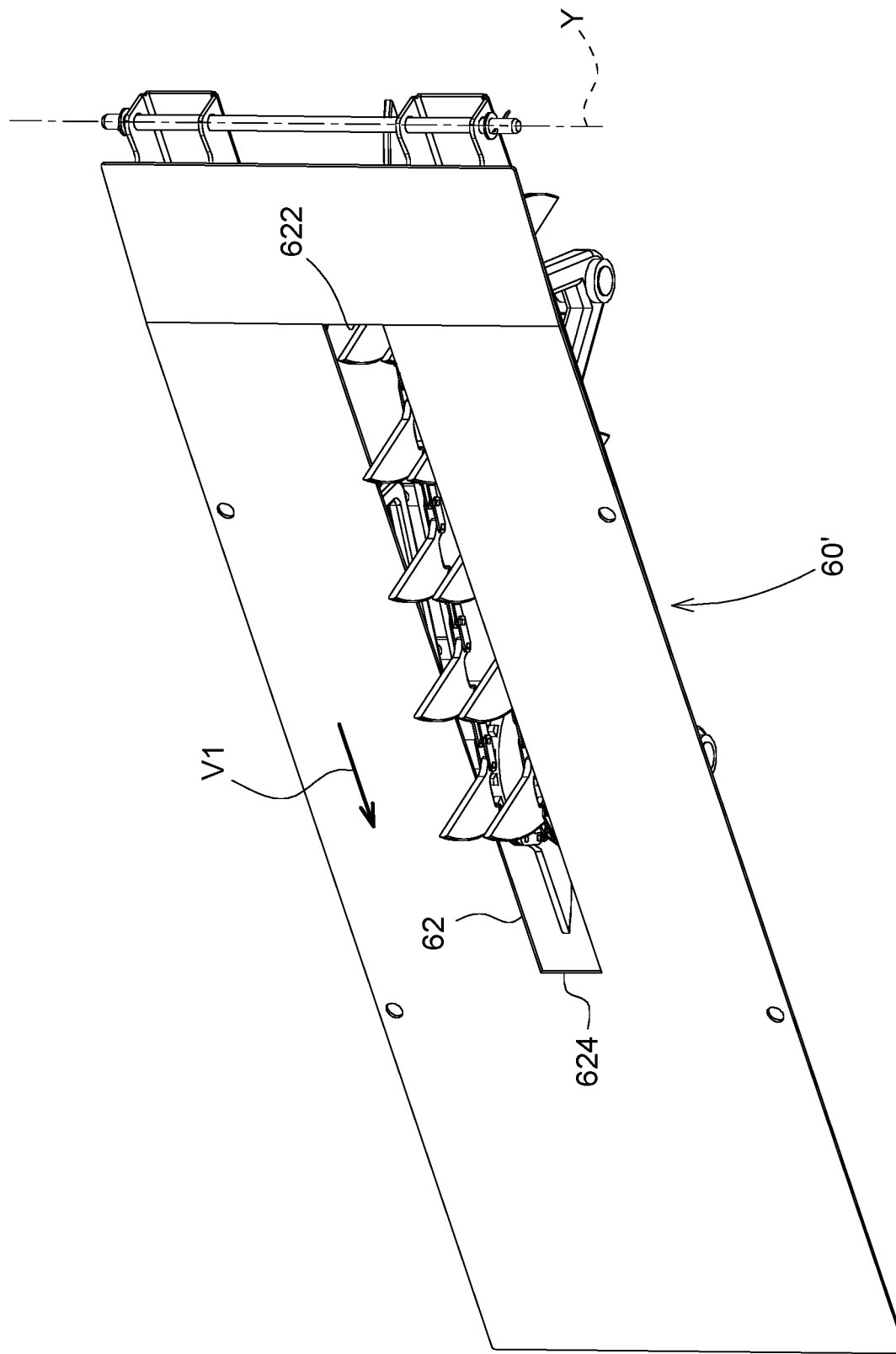
FIG. 8C is an enlarged view of the first hook mechanism in an interior of the compression chamber of FIG. 8A.
Figure 9A:
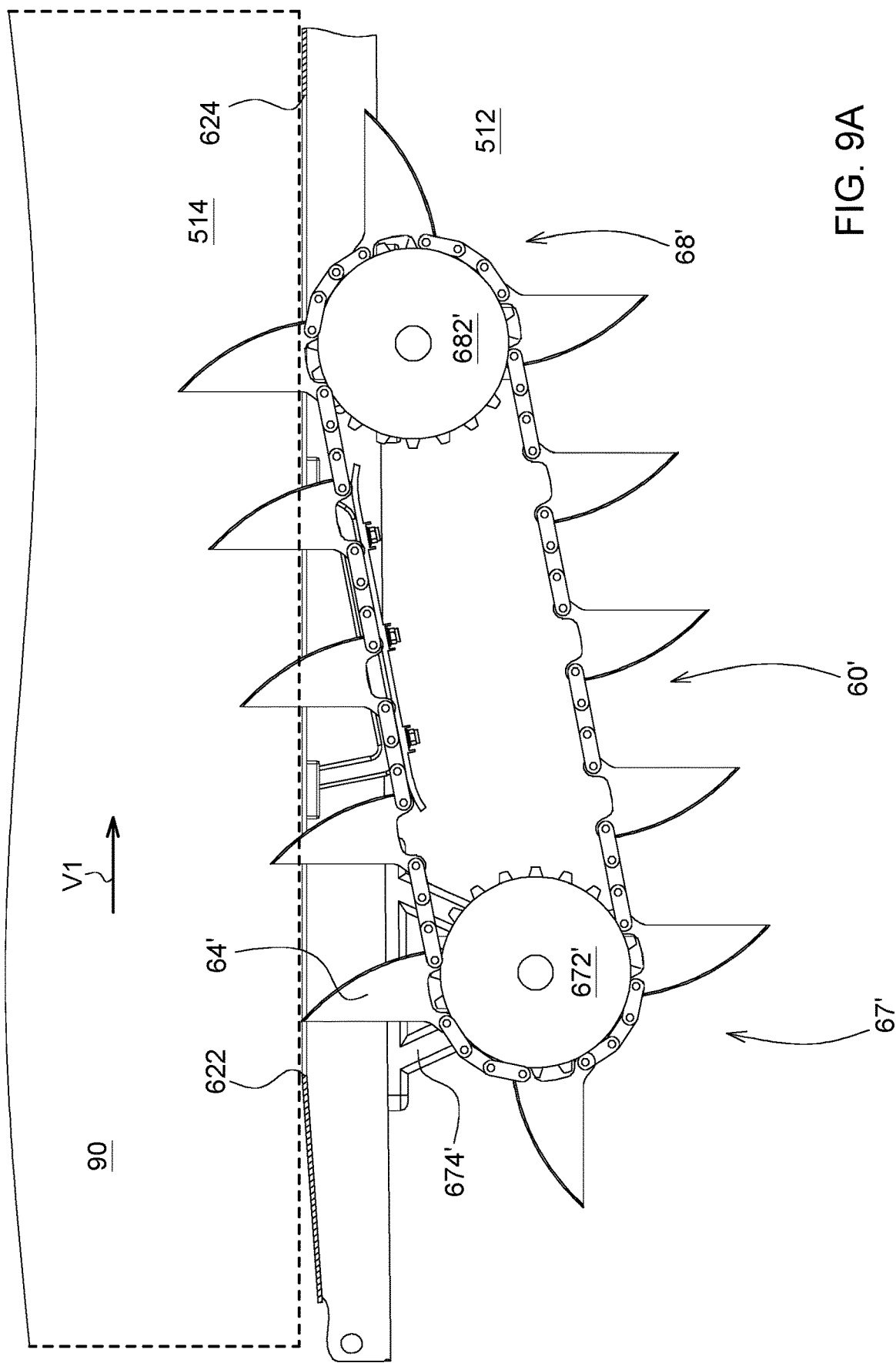
FIG. 9A illustrates a schematic top view of the first hook mechanism of FIG. 8A.
Figure 9B:
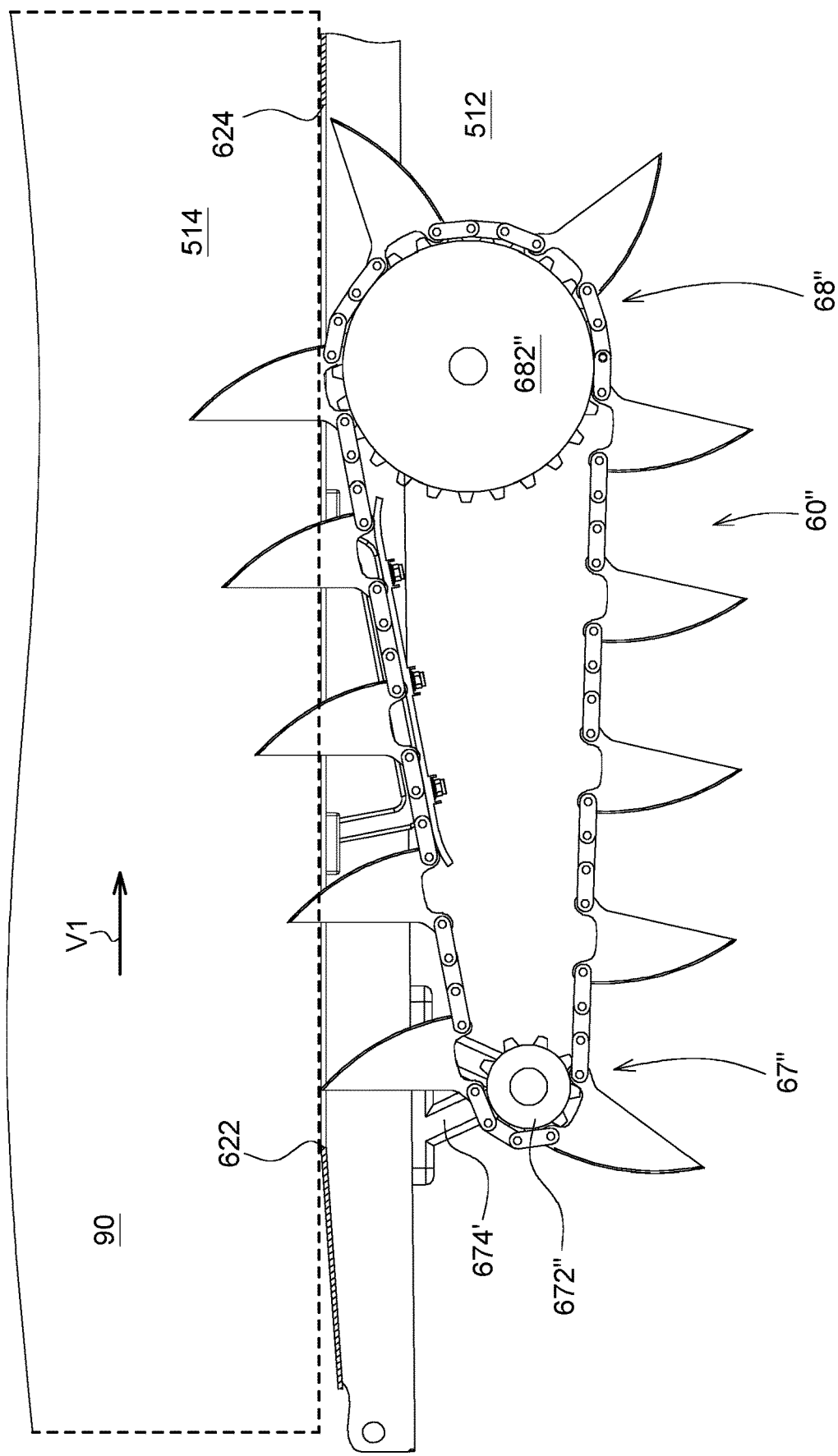
FIG. 9B illustrates a schematic top view of the first hook mechanism in another implementation, where the first shaft and the second shaft have different diameters.

Referring to FIG. 8B, unlike the implementation shown in FIG. 9A, where the diameter of the first sprocket 672' and the diameter of the second sprocket 682' may be the same, the first sprocket 672" and the diameter of the second sprocket 682" shown in FIG. 8B are different.

Without in any way limiting the scope, interpretation, or application of the claims appearing below, a technical effect of one or more of the example embodiments disclosed herein is to generate resistance in the crop material in the compression chamber such the plunger can continue to build consistent density of the currently forming bale. Another technical effect of one or more of the example embodiments disclosed herein is to provide flexibility for the design of the baler implement. For example, the plunger can continue to build consistent density of the currently forming bale regardless of surface friction and at a lower dependency on surface area of the tension panels. Another technical effect of one or more of the example embodiments disclosed herein is to increase or decrease the resistance on a per-side basis of the currently forming bale could adjust for inconsistent windrow shape or operator driving and still to produce square bale in decent shape.

As used herein, "e.g.," is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally," "substantially" or "approximately" are understood by those of ordinary skill to refer to reasonable ranges outside of a given value or orientation, for example, general tolerances or positional relationships associated with manufacturing, assembly, and use of the described embodiments.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. A baler implement, comprising:
a frame having a central longitudinal axis;
a first panel partially forming a compression chamber for compressing crop therein;
a plunger operable to reciprocate within the compression chamber to provide a compressive force to compress crop material in the compression chamber into a flake against a plurality of other flakes of a currently forming bale, and to move the currently forming bale through the compression chamber;
a first hook positioned on the first panel and operable to engage the currently forming bale inside the compression chamber to resist the compressive force applied by the plunger to increase compression of the crop material within the compression chamber;
a sensor coupled to a portion of the plunger and operable to measure a characteristic of the portion of the plunger and to transmit a signal indicative of the characteristic of the portion of the plunger; and
a controller configured to change the resistive force from a resistor based on the signal indicative of the characteristic of the portion of the plunger;
wherein the first panel includes a slot, and wherein the first hook includes a first tooth shaped to penetrate into the currently forming bale through the slot in the first panel;
wherein the slot includes a front edge and a rear edge opposite to the front edge along the central longitudinal axis, and wherein the first tooth travels between the front edge and the rear edge in a first direction with the currently forming bale while resisting movement of the currently forming bale;
wherein the first hook includes the resistor, and the resistor is controllable to provide an adjustable resistive force on the currently forming bale, via the first tooth of the first hook, against the compressive force applied by the plunger.

2. The baler implement of claim 1, wherein the first hook includes a resistor coupled to one of the first panel or the frame, wherein the resistor is operable to generate a resistive force against the currently forming bale in response to the compressive force applied by the plunger to increase a density of the currently forming bale.

3. The baler implement of claim 1, wherein the first hook includes a first carrier on which a root of the first tooth is mounted, wherein the first carrier is operable to be pulled by the first tooth traveling along the slot.

4. The baler implement of claim 3, wherein the first hook includes a first shaft and a second shaft both coupled to the first carrier and spaced apart from each other along the central longitudinal axis, wherein the first carrier includes an endless loop surrounding the first shaft and the second shaft, and at least one of the first shaft and the second shaft is coupled to the resistor, which is a rotational resistor, to transfer a resistance from the resistor to the first carrier and then to the currently forming bale.

5. The baler implement of claim 4, wherein the second shaft is positioned in front of the rear edge with a distance greater than a thickness of the first carrier and a length of the first tooth, whereby the first tooth is drawn out of the forming bale and through the slot to an exterior of the compression chamber.

6. The baler implement of claim 4, wherein the resistor includes one of a hydraulic retarder, a friction brake, a magnetic resistive device, or an electric motor.

7. The baler implement of claim 4, further comprising a cover positioned between the first shaft and the second shaft and operable to cover a portion of the slot, so as to prevent the crop material from leaving the compression chamber to an exterior of the compression chamber through the slot.

8. The baler implement of claim 4, further comprising a ramp configuration formed by a first shaft and a second shaft relative to the first panel, such that the first tooth penetrates into the currently forming bale through the slot in different extent when the first tooth travels from the front edge to the rear edge of the slot.

9. The baler implement of claim 3, wherein the first hook includes a second tooth shaped to penetrate into the currently forming bale through the slot in the first panel and a second carrier on which a root of the second tooth is mounted, wherein the second carrier operable to be pulled by the second tooth traveling along the slot, and the first carrier and the second carrier run parallel to each other.

10. The baler implement of claim 1, further comprising an actuator coupled between the frame and one of the panels and moveable to compress the panel toward the currently forming bale to increase a friction between a surface of the panel and the currently forming bale; wherein the controller is operable to move the actuator based on the signal indicative of the characteristic of the portion of the plunger.

11. The baler implement of claim 1, wherein the first tooth is a hook shape with a curved edge facing opposite the direction of movement of the currently forming bale in the compression chamber and is operable to engage the currently forming bale.

12. The baler implement of claim 1, further comprising a second panel partially forming the compression chamber and a second hook positioned on the second panel, wherein the second hook is operable to engage the currently forming bale inside the compression chamber to resist the force applied by the plunger, and the second hook includes another resistor, wherein the resistor of the second hook is controllable to provide an adjustable resistive force on the currently forming bale, via the first tooth of the second hook, against the compressive force applied by the plunger.

13. The baler implement of claim 12, wherein the first panel and the second panel are positioned on opposite sides across the currently forming bale.

14. The baler implement of claim 13, further comprising:
a sensor operable to measure a characteristic of the currently forming bale and to transmit a signal indicative of the characteristic of the currently forming bale; and
a controller operable to differentiate the adjustable resistive force from the resistor of the first hook and the adjustable resistive force from the resistor of the second hook based on the signal indicative of the characteristic of the currently forming bale.

15. The baler implement of claim 13, further comprising:
an input device operable to transmit a signal to control the first hook and the second hook;
a controller coupled to the input device and operable to differentiate the adjustable resistive force from the resistor of the first hook and the adjustable resistive force from the resistor of the second hook based on the signal from the input device.

16. The baler implement of claim 12, further comprising a wrapping assembly operable to encircle the currently forming bale with a twine to form a completed bale, wherein sides of the currently forming bale against which the first hook and the second hook engage are different from sides of the forming bale on which the wrapping assembly wraps or encircles the bale.

17. A baler implement, comprising:
a frame having a central longitudinal axis;
a first panel partially forming a compression chamber for compressing crop therein;
a plunger operable to reciprocate within the compression chamber to provide a compressive force to compress crop material in the compression chamber into a flake against a plurality of other flakes of a currently forming bale, and to move the currently forming bale through the compression chamber;
a first hook positioned on the first panel and operable to engage the currently forming bale inside the compression chamber to resist the compressive force applied by the plunger to increase compression of the crop material within the compression chamber;
wherein the first hook includes a resistor, wherein the resistor is controllable to provide an adjustable resistive force on the currently forming bale, via the first tooth of the first hook, against the compressive force applied by the plunger;
a sensor coupled to a portion of the plunger and operable to measure a characteristic of the portion of the plunger and to transmit a signal indicative of the characteristic of the portion of the plunger; and
a controller configured to change the resistive force from the resistor based on the signal indicative of the characteristic of the portion of the plunger.

* * * * *